US008363855B2

(12) United States Patent
Griesinger

(10) Patent No.: US 8,363,855 B2
(45) Date of Patent: Jan. 29, 2013

(54) MULTICHANNEL DOWNMIXING DEVICE

(75) Inventor: David H. Griesinger, Cambridge, MA (US)

(73) Assignee: Harman International Industries, Inc., Stamford, CT (US)

( * ) Notice: Subject to any disclaimer, the term of this patent is extended or adjusted under 35 U.S.C. 154(b) by 1123 days.

(21) Appl. No.: 12/243,746

(22) Filed: Oct. 1, 2008

(65) Prior Publication Data

US 2009/0028360 A1 Jan. 29, 2009

Related U.S. Application Data

(63) Continuation of application No. 10/429,276, filed on May 2, 2003, now Pat. No. 7,450,727.

(60) Provisional application No. 60/377,661, filed on May 3, 2002.

(51) Int. Cl.
*H04B 1/00* (2006.01)

(52) U.S. Cl. ............................ 381/119; 381/80; 381/18

(58) Field of Classification Search .................. 381/119, 381/108, 81, 80, 18, 19, 17, 20, 21, 22, 23; 345/573; 700/94; 704/500
See application file for complete search history.

(56) References Cited

U.S. PATENT DOCUMENTS

| | | | |
|---|---|---|---|
| 4,862,502 | A | 8/1989 | Griesinger |
| 4,884,972 | A | 12/1989 | Gasper |
| 5,109,419 | A | 4/1992 | Griesinger |
| 5,136,650 | A | 8/1992 | Griesinger |
| 5,161,197 | A | 11/1992 | Griesinger |
| 5,594,800 | A | 1/1997 | Gerzon |
| 5,610,986 | A | 3/1997 | Miles |
| 5,705,108 | A | 1/1998 | Nonogaki |
| 5,740,264 | A | 4/1998 | Kojima |
| 5,796,844 | A | 8/1998 | Griesinger |
| 5,867,819 | A | 2/1999 | Fukuchi et al. |
| 5,870,480 | A | 2/1999 | Griesinger |
| 6,140,645 | A | 10/2000 | Tsuno |
| 6,141,645 | A | 10/2000 | Chi-Min et al. |
| 6,332,026 | B1 | 12/2001 | Kuusama et al. |
| 6,349,285 | B1 | 2/2002 | Liu et al. |
| 6,683,962 | B1 | 1/2004 | Griesinger |
| 6,697,491 | B1 | 2/2004 | Griesinger |
| 2004/0091118 | A1 | 5/2004 | Griesinger |

FOREIGN PATENT DOCUMENTS

| | | | |
|---|---|---|---|
| EP | 0783238 | A3 | 7/1997 |
| EP | 0 783 238 | A3 | 7/1998 |
| GB | 2 312 130 | A | 10/1997 |
| GB | 2312130 | A | 10/1997 |
| JP | 09-252254 | | 9/1997 |

(Continued)

OTHER PUBLICATIONS

Griesinger, David; General Overview of Spatial Impression, Envelopment, Localization, and Externalization; AES 15th International Conference; Oct. 31-Nov. 2, 1998; Snekkersten, Copenhagen, Denmark; pp. 136-149.

(Continued)

*Primary Examiner* — Vivian Chin
*Assistant Examiner* — Con P Tran
(74) *Attorney, Agent, or Firm* — Brooks Kushman P.C.

(57) ABSTRACT

A downmixer provides a listener of an output signal with a substantially accurate rendition of the apparent direction and relative loudness of an input signal. Downmixing certain channels of the input signal independently may substantially preserve the energy and intended direction of the input signal. The downmixer may include a test downmixer that operates over a limited frequency range to more accurately reflect the loudness of the input signal at the output, as perceived by a listener. The downmixer may demand fewer resources, freeing up resources for use in other operations.

20 Claims, 13 Drawing Sheets

FOREIGN PATENT DOCUMENTS

| | | |
|---|---|---|
| JP | 09-0252254 | 9/1997 |
| JP | 2000-308200 | 11/2000 |
| WO | WO 98/20708 | 5/1998 |

OTHER PUBLICATIONS

Griesinger, David; How Loud is my Reverberation?; AES 98th Convention; Feb. 25-28, 1995; Paris, France; pp. 1-11.
Griesinger, David; Beyond MLS-Occupied Hall Measurement with FFT Techniques; AES 101st Convention; Nov. 8-11, 1995; Los Angeles, California; 23pp.
Griesinger, David; The Psychoacoustics of Apparent Source Width, Spaciousness and Envelopment in Performance Spaces; Acustica; vol. 83; Sep. 25, 1997; pp. 721-731.
Griesinger, David; Spaciousness and Envelopment in Musical Acoustics; AES 101st Convention; Nov. 8-11, 1995; Los Angeles, California; 23pp.
Griesinger, D.; Further Investigation into the Loudness of Running Reverberation; Proceedings of the Institute of Acoustics; vol. 17, Part 1; 1995; pp. 35-42.
Griesinger, David; The Science of Surround; Sep. 27, 1999; 70pp.
Griesinger, David; Practical Processors and Programs for Digital Reverberation; AES 7th International Conference; May 14-17, 1989; pp. 187-195.
Griesinger, David; Surround: The Current Technological Situation; SMPTE Journal; Dec. 2001; pp. 857-866.
Griesinger; David; Design and Performance of Multichannel Time Variant Reverberation Enhancement Systems; Active 95; Jul. 6-8, 1995; Newport Beach, CA; pp. 1203-1212.
Griesinger, David; Optium Reverberant Level in Halls; 15th International Congress on Acoustics; Trondheim, Norway; Jun. 26-30, 1995; pp. 477-480.
Griesinger, David; Feedback Reduction and Acoustic Enhancement Using an Inexpensive Digital Sound Processor; 15th International Congress on Acoustics; Trondheim, Norway; Jun. 26-30, 1995; pp. 473-476.
Griesinger, David; Impulse Response Measurements Using All-Pass Deconvolution; Proceedings of the 11th International AES Conference; Test & Measuring Conference; May 29-31, 1992; Portland, Oregon; pp. 308-321.
Griesinger, David; Multichannel Matrix Surround Decoders for Two-Eared Listeners; AES 101st Convention; Nov. 8-11, 1996; Los Angeles, California; 22 pp.
Griesinger, David; Practical Processors and Programs for Digital Reverberation; AES 7th International Conference; pp. 187-195.
Griesinger, David; Progress in 5-2-5 Matrix Systems; AES 103rd Convention; Sep. 26-29, New York, NY; 35 pages.
Griesinger, David; Multichannel Sound Systems and Their Interaction with the Room; AES 15th International Conference; pp. 159-173.
Griesinger, David; Stereo and Surround Panning in Practice; Audio Engineering Society Convention Paper 5564; 112th Convntion; May 10-13, Munich, Germany; pp. 1-6.
Griesinger, David.; IALF-Binaural Measures of Spatial Impression and Running Reverberance; AES 92nd Convention; Mar. 24-27, 1992, Vienna, Austria; 43pp.
Griesinger, David; Measures of Spatial Impression and Reverberance Based on the Physiology of Human Hearing; AES 11th International Conference; pp. 114-145.
Griesinger, David; Room Impression, Reverberance, and Warmth in Rooms and Halls; AES 93rd Convention; Oct. 1-4, 1992; San Francisco, California; 22pp.
Griesinger, David; Improving Room Acoustics Through Time-Variant Synthetic Reverberation; AES 90th Convention; Feb. 19-22, 1991; Paris, France; 28pp.
Griesinger, David; Binaural Techniques for Music Reproduction; AES 8th International Conference; pp. 197-207.
Griesinger, David; Theory and Design of a Digital Audio Signal Processor for Home Use; J. Audio Eng. Soc.; vol. 37, No. 1/2; Jan./Feb. 1989; pp. 40-50.
Griesinger, David; Equalization and Spatial Equalization of Dummy6-Head Recordings for Loudspeaker Reproduction; J. Audio Eng. Soc.; vol. 37, No. 1/2; Jan./Feb. 1989; pp. 20-29.
Griesinger, David; Speaker Placement, Externalization, and Envelopment in Home Listening Rooms; AES 105th Convention; Sep. 26-29, 1998; San Francisco, California; 49pp.
Griesinger. David; AES 82nd Convention; Mar. 10-13, 1987; London, England;,24pp, "New Perspectives on Coincident and Semicoincident Microphone Arrays".
Griesinger, David; Spaciousness and Localization in Listening Rooms and Their Effect on the Recording Technique; J. Audio Eng. Soc; vol. 34, No. 4; Apr. 1986; pp. 255-268.
Griesinger, David, "Practical Processors and Programs for Digital Reverberation", Proceedings of the AES 7th International Conference, Audio Engineering Society, Toronto, May 1989, pp. 187-195.
Griesinger, David, "Multichannel Matrix Surround Decoders for Two-Eared Listeners", Presented at the 101st Convention Audio Engineering Society, Nov. 8-11, 1996, Preprint # 4402, 21 pages.
Griesinger, David, "Spaciousness and Envelopment in Musical Acoustics", Presented at the 101th Convention of the Audio Engineering Society, Nov. 8-11, 1996, Preprint # 4401, 23 pages.
Griesinger, David, "Speak Placement, Externalization, and Envelopment in Home Listening Rooms", Presented at the 105th Convention of the Audio Engineering Society, San Francisco, 1998, Preprint # 4860, 48 pages.
Griesinger, David, "General Overview of Spatial Impression, Envelopment, Localization, and Externalization", Proceedings of the 15th International Conference of the AES on small room acoustics, Denmark, Oct. 31-Nov. 2, 1998, pp. 136-149.
Griesinger, David, "Spaciousness and Localization in Listening Rooms and their Effects on the Recording Technique", J. Audio Eng. Soc., vol. 34, No. 4, Apr. 1986, pp. 255-268.
Griesinger, David, "New Perspectives on Coincident and Semicoincident Microphone Arrays", presented at the 82nd convention of the AES, preprint # 2464, 24 pages.
Griesinger, David, "Equalization and Spatial Equalization of Dummy-Head Recordings for Loudspeaker Reproduction", J. Audio Eng. Soc., vol. 37, No. 1/2, 1989, pp. 20-28.
Griesinger, David, "Theory and Design of a Digital Audio Processor for Home Use", J. Audio Eng. Soc., vol. 37, No. 1/2, 1989, pp. 0-29.
Griesinger, David, "Binaural Techniques for Music reproduction", Proceedings of the 8th International Conference of the AES, 1990, pp. 197-207.
Griesinger, David, "Improving room acoustics through time variant synthetic reverberation", AES convention Paris, Feb. 1992, reprint # 3014, 27 pgs.
Griesinger, David, "Room Impression Reverberance and Warmth in Rooms and Halls", presented at the 93rd AES Convention in Sun Francisco, Nov. 1992, Preprint #3383, 21 pgs.
Griesinger, David, "Measures of Spatial Impression and Reverberance based on the Physiology of Human Hearing", Proceedings of the 11th International AES Conference, May 1992, pp. 114-145.
Griesinger, David, "IALF-Binaural Measures of Spatial Impression and Running Reverberance", Presented at the 92nd convention of the AES, Mar. 1992, preprint #3292, 42 pgs.
Griesinger, David, "Stereo and Surround Panning in Practice", Presented at the 112th convention of the AES, Munich Germany, May 2002, 6 pages.
Griesinger, David, "Progress in 5-2-5 Matrix Systems", Presented at the 103rd convention of the AES, New York, Sep. 197, 34 pages.
Griesinger, David, "Multichannel Sound Systems and Their Interaction with the Room", Presented at the 15th International Conference of the AES, Copenhagen, Denmark, Oct. 1998, pp. 158-173.
Griesinger, David, "How Loud Is My Reverberation?", Presented at the 98th convention of the AES, Paris, Feb. 1995, 11 pages.
Griesinger, David, "Beyond MLS—Occupied Hall Measurement with FFT Techniques", Presented at the 101th convention of the AES, Los Angeles, California, Nov. 1996, 23 pages.
Griesinger, David, "Spaciousness and Localization in Listening Rooms and Their Effects on the Recording Technique", J. Audio Eng. Soc., vol. 34, No. 4, 1986, pp. 225-268.

Griesinger, David, "The Psychoacoustics of Apparent Source Width, Spaciousness and Envelopment in Performance Spaces", Acta Acoustics, vol. 83, 1997, pp. 721-731.
Griesinger, David, "Surround: The Current Technological Situation", SMPTE Journal, 2001, pp. 857-866.
Griesinger, David, "Practical Processors and Programs for Digital Reverberation", Presented at the 7th International Conference of the AES, Toronto, Canada, May 1989, pp. 187-195.
Griesinger, David, "Impulse Response Measurements Using All-Pass Deconvolution", Presented at the 11th International Conference of the AES, Portland, Oregon, May 1992, pp. 308-321.
Griesinger, David, "Feedback Reduction and Acoustic Enhancement Using an Inexpensive Digital Sound Processor", Presented at the 15th International Congress on Acoustics, Trondheim, Norway, Jun. 1995, pp. 473-476.
Griesinger, David, "Optimum Reverberant Level in Halls", Presented at the 15th International Congress on Acoustics, Trondheim, Norway, Jun. 1995, pp. 477-480.
Griesinger, David, "Design and Performance of Multichannel Time Variant Reverberation Enhancement Systems", Active 95, Jul. 1995, pp. 1203-1212.
Griesinger, D., "Further Investigation Into the Loudness of Running Reverberation", Proc. I.O.A., vol. 17, Part 1, 1995, pp. 35-42.
Griesinger, David, "The Science of Surround", presentation material from a speech given at McGill University, copyright by David Griesinger, Sep. 1999, 69 pages.

MULTICHANNEL DOWNMIXING DEVICE

TECHNICAL FIELD

This application is a continuation of U.S. patent application Ser. No. 10/429,276, filed May 2, 2003, which claims priority to U.S. Provisional Application No. 60/377,661, filed May 3, 2002, both of which are hereby incorporated by reference.

BACKGROUND OF THE INVENTION

Related Art

The invention relates to a mixing device, and more specifically, to a downmixer capable of mixing a multichannel signal including a plurality of channels to an output signal including a plurality of channels, while preserving the intended direction and signal energy of the multichannel signal.

Often, audio recordings, or movie soundtracks (film mixes), are created with more than two audio channels, to give a listener a more realistic feeling that the audio recording is live. For example, film mixes may be created as 3 channel recordings, providing left front (LF), right front (RF) and center (C) channels. Film mixes may instead be created as 5 channel recordings, including the LF, RF and C channels, along with rear left (RL) and rear right (RR) channels, or in some circumstances, as 5.1 channel recordings including the channels of the 5 channel recording plus a low frequency (LFE) channel.

However, the listener of the audio recording or film mix may have an audio system that supports less channels than the number of channels in which the audio recording or film mix has been created. Typically, this occurs when the listener's audio system supports only 2 channel (i.e., stereo) playback. In this circumstance, such recordings are provided to a listener as a 2 channel recording by utilizing a combiner (downmixer) to combine, or downmix, the multichannel signal to 2 channels. The downmixing may occur at an encoder, for example, where a 2 channel recording is provided on the media (i.e., CD, DVD, etc.). The downmixing may occur at a decoder of the listener's audio system where the decoder downmixes the multichannel signal to the 2 channel mix.

When downmixing a multichannel signal to 2 channels, downmixers typically employ fixed mix coefficients. A common downmixer used for 5 channel film recordings mixes the two rear channels together before mixing them in antiphase to the output channels. This may cause any signal in the rear channels to reproduce from the rear in standard film decoders. However, information about whether the sound was from the left rear or the right rear is typically lost.

A common downmixer for classical music, for example utilizing a European Standard for 5 channel downmixing, mixes the two rear channels directly into the output channels, without any inversion of phase. This may preserve the left/right directionality of the rear channels, but does not preserver an indication that the signals were intended to be heard behind the listener. The resulting mix causes the downmixed signal to appear as if it were in front of the listener, both in two channel playback, and when played through a standard film decoder.

Some downmixers may slightly vary mix ratios as an attempt to preserve signal energy, for example, where surround input signals are anticorrelated with respect to one another. However, signal energy and apparent direction of the multichannel signal is not substantially preserved, for example, where the input signal pans between input channels.

Further, both the standard film downmixer, and the European Standard downmixer attenuate the rear channels by 3 dB before mixing them into the output channels. This attenuation may cause the loudness of a sound effect applied to one of the rear channels to be lower than the original five channel mix. In this case the energy in the rear inputs is not preserved in the output channels.

Yet another problem with the above discussed encoders/decoders is in the handling of sound events (i.e., a short burst of sound with a well defined beginning and that may or may not have a well defined end, such as notes from an instrument, or syllables in speech) when downmixing the input signal. The downmixing algorithms employed cause the sound event to be reduced in emphasis in the downmixed signal, especially in the presence of reverberation. The downmixers discussed above cause the sound events to be downmixed in the front channels. However, when these sound events are downmixed into the front channels, they may become less audible or even inaudible.

Further, downmixers that mix three front channels into two output channels suffer from a directional localization problem, where sounds that are mixed in a three channel recording so they are perceived as coming half-way between the left (or right) front channel and the center channel, are perceived as coming from a different spot when the three channel signal is downmixed to two channels and reproduced through two loudspeakers. In practice, the sound image in the two channel downmix is almost at the left loudspeaker (or right), instead of exactly half-way between the center and the left.

Therefore, a need exists for a downmixer that preserves the intended direction and the signal energy of a multichannel mix. Additionally, a need exists for a downmixer that properly mixes an input signal in the presence of reverberation and that emphasizes sound events within the input signal during the downmixing process.

SUMMARY

A downmixer system is provided for generating mix coefficients for downmixing a multichannel input signal having a plurality of input channels, to an output signal having a plurality of output channels. Mix coefficients may be generated responsive to a comparison of energy between the downmixed (output) signal and the input signal to the downmixer, such that energy and intended direction of the input signal is substantially preserved in the output signal. The number of input channels of the input signal may be greater than, or equal to, the number of output channels in the output signal. Further, or in the alternative, the mix coefficient generation may preserve intended direction of an input signal, for example, received at a surround input channel, in at least one output channel of the output signal. In this circumstance, the preserved intended direction may be utilized at an upmixer capable of decoding surround channel information, to place the surround channel information in the surround channel(s) of the upmix.

The mix coefficients may be generated in a test downmixer environment, where the test downmixer environment may be utilized to generate the mix coefficients responsive to input and output signal energy determined using limited-bandwidth (i.e., filtered) input signals received at the test downmixer. The mix coefficients determined using the test downmixer may then be utilized in a full-bandwidth downmixer.

Mix coefficient values may be generated by retrieving predetermined mix coefficient values. The predetermined mix coefficient values may be stored in a tabular format at a storage device of the downmixer, for example, as one-dimensional or two-dimensional tables. The tables may be indexed by a ratio of output energy to input energy. When a substantially similar output to input ratio is encountered while downmixing an input signal, it may be possible to retrieve one or more mix coefficients from a mix coefficient table to be used in downmixing the input signal.

Mix coefficients may be generated responsive to an input energy of a plurality of the input channels. An energy ratio between at least one of the input channels and at least another of the input channels may be determined, where the mix coefficient generation is responsive to the energy ratio. The mix coefficient generation may include increasing one or more mix coefficient values, or decreasing one or more mix coefficient values. Further, a beginning of a sound event may be detected, where the mix coefficient generation may be responsive to the input energy and the beginning of the sound event detection.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
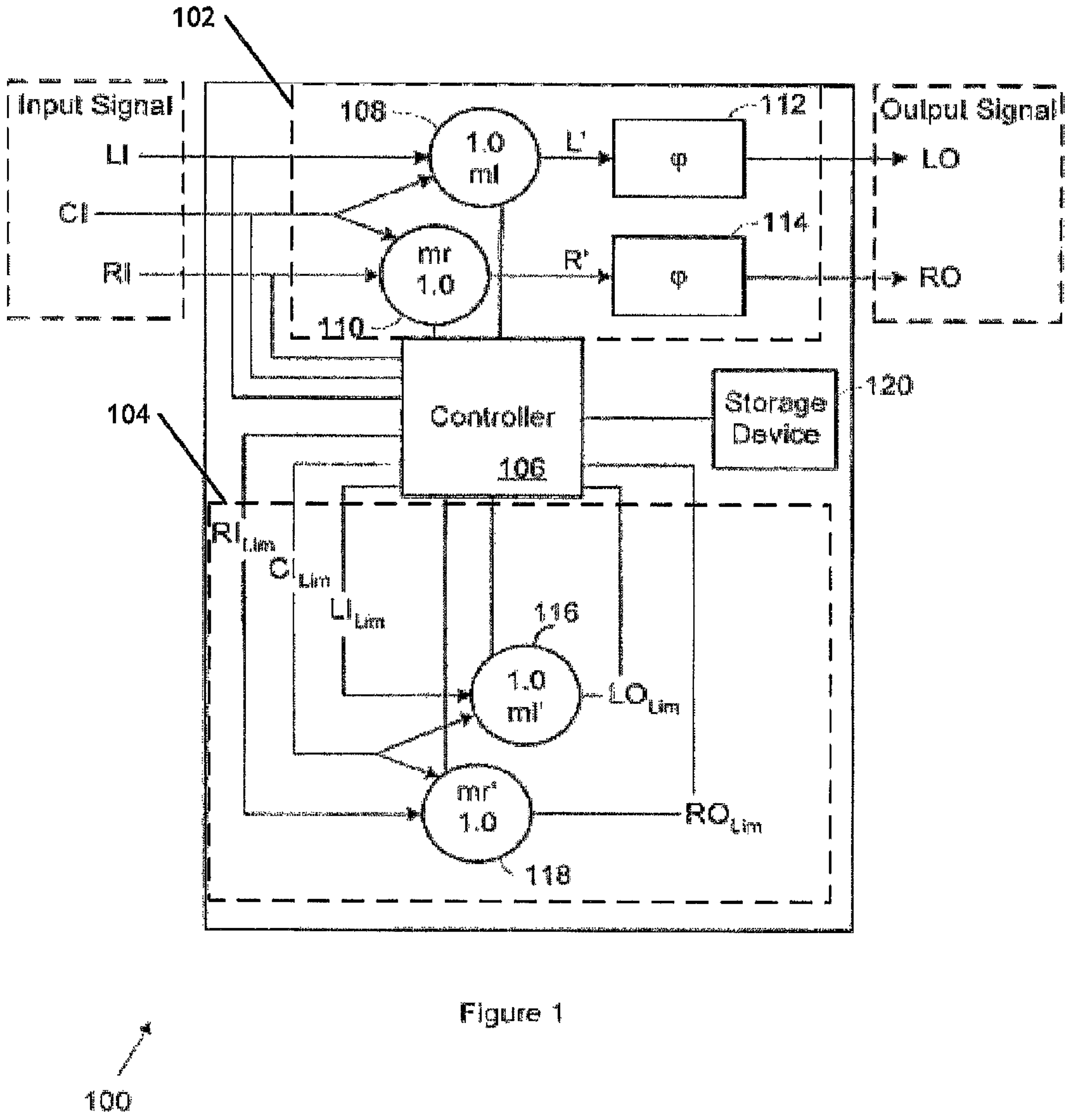
FIG. 1 is a functional block diagram of a downmixer device for downmixing a three channel input signal to a two channel output signal.

A downmixer system is provided for generating mix coefficients for downmixing a multi-channel input signal having a plurality of input channels to an output signal having a plurality of output channels. An input energy level may be determined for at least a plurality of the input channels, and mix coefficients may be generated responsive to the determining at least one of the input and output energy levels such that the signal energy and the intended direction of the input signal are substantially preserved. An output energy level may be determined for at least one of the output channels, where mix coefficients may be generated responsive to the input and output signal energy such that the signal energy and the intended direction of the input signal are substantially preserved in the output signal.

The number of output channels in the output signal may be less than the number of input channels of the input signal, for example, when a three channel input signal is downmixed to a two output channel output signal. The number of input channels of the input signal may be equal to the number of output channels of the output signal, for example, where the downmixer is utilized to downmix surround channel information.

The downmixer may provide a listener of the output signal with a substantially accurate rendition of the apparent direction and relative loudness of the input signal. When downmixing an input signal including both front channel and surround channel information, the downmixer may be capable of downmixing the front channel and surround channel information independently, to substantially preserve energy and intended direction of the input signal at the output signal. The downmixed surround and downmixed front channel information may be combined (i.e., added together) to produce a two channel mix of the input signal.

The downmixer may be capable of altering an energy ratio between front input channels and surround input channels of the input signal during downmixing of the input multichannel signal to the output signal. The energy ratio alterations may be utilized to provide a substantially accurate rendition of reverberation present in the multichannel input signal to the output signal. The energy ratio alterations for downmixing may be accomplished through mix coefficient adjustments. Additionally, mix coefficients may be adjusted to emphasize sound events (i.e., notes from an instrument, syllables (phones) of speech, etc.). Sound events may occur in one or more of the input channels, for example, the left and right surround channels, to provide a substantially accurate rendition of the sound events at the output signal of the downmixer.

Downmixers for downmixing input signals with 3 input and 5.1 input channels to an output signal having 2 output channels will be discussed below. However, it will be apparent that the teachings herein may be applied to input signals having a different number of input channels, and that may be downmixed to an output signal with more than two output channels.

FIG. 1 is a functional block diagram of a downmixing device capable of downmixing a multi-channel input signal including at least 3 input channels to an output signal including a number of output channels less than the number of input channels, here 2 output channels. As shown in FIG. 1, a downmixer 100 includes a full-bandwidth downmixer generally indicated at 102, for downmixing the multi-channel input signal to the output signal responsive to generated left and right channel mix coefficients ml and mr, such that signal energy and an intended direction of the input signal are substantially preserved in the output signal. The full-bandwidth downmixer 102 is capable of downmixing over a broad range of frequencies, for example, over the 20-20,000 frequency range. Other frequency ranges are possible. The downmixer 100 may further include a test downmixer 104, and a controller 106, where the test downmixer 104 and controller 106 may be utilized for generating test mix coefficient values, that may be used to update the left and right mix coefficients ml and mr of the full-bandwidth downmixer 102, to allow substantial preservation of the signal energy and intended direction of an input signal at the output signal, as described below. The test downmixer may operate over a limited frequency range, for example 700-4000 Hz frequency range. Other frequency ranges are possible. The limited frequency range of operation of the test downmixer may be advantageous as allowing the mix coefficients of the full-bandwidth downmixer 102 to be generated using a range of frequencies over which human listeners may be particularly sensitive. Generating the mix coefficients in this fashion may allow for mix coefficient generation that more accurately reflects loudness of the input signal at the output signal, as perceived by human listeners.

As energy and intended direction are substantially preserved at the test downmixer 104 using the test mix coefficients, the test mix coefficient values, if used in the full-bandwidth downmixer, will allow the energy and intended direction of the input signal at the full-bandwidth downmixer to be substantially preserved in the output signal. Upon generation of the mix coefficients by the test downmixer 104 and controller 106, the generated values may be utilized to update the mix coefficients of the full-bandwidth downmixer 102.

As shown in FIG. 1, the full-bandwidth downmixer 102 is capable of downmixing an input signal having 3 channels, for example, left (LI), center (CI) and right (RI) input channels to be downmixed to an output signal having 2 channels, for example, left output (LO) and right output (RO) channels.

The full-bandwidth downmixer 102 includes a first mixer 108 and a second mixer 110, the first and second mixers specifying mix coefficients including a left channel mix coefficient ml and a right channel mix coefficient mr respectively, for mixing the CI channel with the LI and RI channels. The CI channel may be mixed with the LI and RI channels to generate respective L' and R' channels. The first mixer 108 is coupled with a first phase shifter 112 for providing a desired phase shift to the L' channel, for generating the LO channel of the output signal. Similarly, the second mixer 110 is coupled with a second phase shifter 114 for applying a desired phase shift to the R' channel, for generating the RO channel of the output signal. The phase shifters 112 and 114 may be capable of providing a pure phase shift to the L' and R' channel information such that the energy and amplitude of the L' and R' are not affected at any frequency.

The test downmixer 104 may include a first test mixer 116 and a second test mixer 118. The first test mixer 116 may be capable of receiving at least one of a limited-bandwidth (i.e., filtered) LI and CI channel information as $LI_{Lim}$ and $CI_{Lim}$, respectively, and mixing the $LI_{Lim}$ and $CI_{Lim}$ channel information using a test left channel mix coefficient ml' to form a limited-bandwidth test mixer left output channel $LO_{Lim}$. Similarly, the second test mixer 118 may be capable of receiving at least one of a limited-bandwidth RI channel information $RI_{Lim}$ and the $CI_{Lim}$ channel information, and mixing the $RI_{Lim}$ and $CI_{Lim}$ channel information using a test right channel mix coefficient mr' to form a limited-bandwidth RO output channel $RO_{Lim}$ of the test mixer 104.

The controller 106 is coupled with the first mixer 108, the second mixer 110, the first test mixer 116 and the second test mixer 118. The controller 106 is capable of receiving one or more of the LI, CI and RI channel information of the input signal, and determining limited-bandwidth (i.e., filtered) channel information, for example, $LI_{Lim}$, $CI_{Lim}$, and $RI_{Lim}$ for use in the test downmixer 104. The controller 106 is additionally capable of receiving output channel information, for example the output channel information LO and RO from the full-bandwidth downmixer 102, and/or the limited-bandwidth output channel information $LO_{Lim}$ and $RO_{Lim}$ from the test downmixer 104, and generating values for one or more mix coefficients, for example, the mix coefficients ml and mr of the full-bandwidth downmixer 102, as described below using the test downmixer 104. The controller 106 may further be coupled with a storage device 120, providing one or more memory devices that may be utilized by the controller 106, for example, as a working memory and/or program memory during operation of the downmixer.

Figure 2:
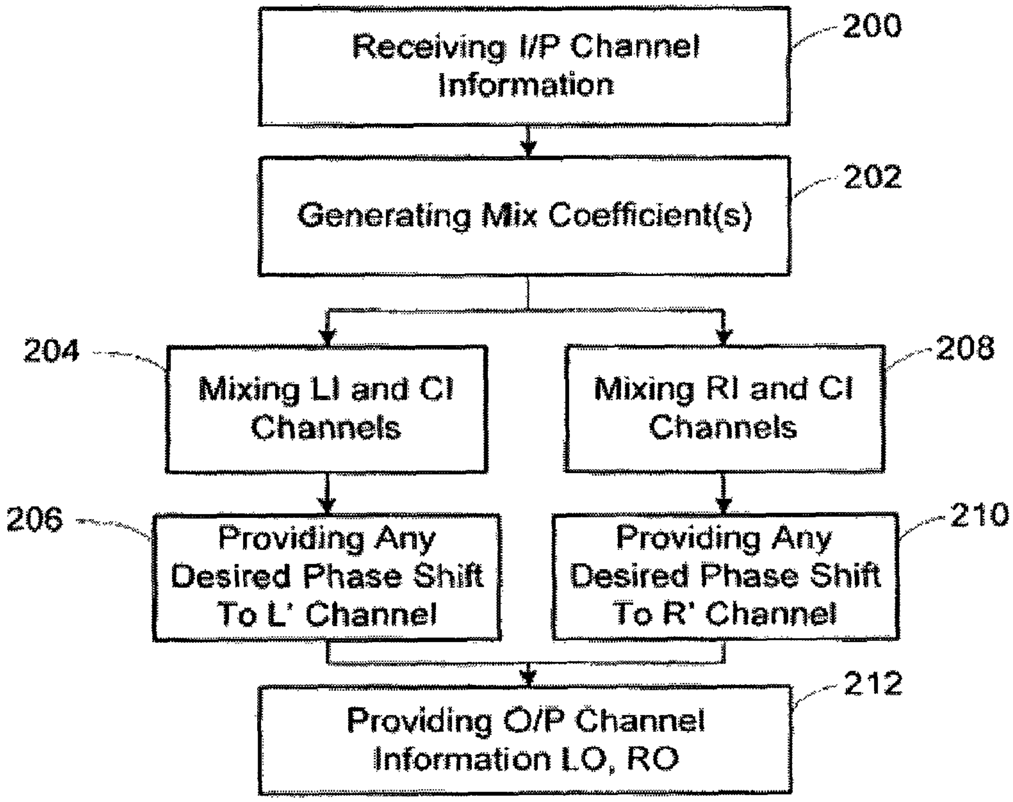
FIG. 2 is a flowchart illustrating operation of the downmixer device of FIG. 1.

FIG. 2 is a flow chart illustrating operation of the downmixer 100 in downmixing a multi-channel (i.e., >2 channel) input signal, here having three channels, to an output signal having a number of channels less than input signal, here two channels. As shown in FIG. 2, input channel information is received 200 at the full-bandwidth downmixer 102, for example as LI, CI, and RI channel information.

The controller 106 is capable of generating 202 at least one of the mix coefficients ml and mr used by the first and second mixers 108 and 110 to mix the LI, CI and RI channel information, for example, using the test downmixer 104, as will be discussed below. The full-bandwidth downmixer 102 may mix 204 the LI and CI channels at the first mixer 108 to form the L' channel, as $$L'=LI+ml*C. \qquad \text{(eqn. 1)}$$

The first phase shifter 112 may then provide 206 a desired phase shift to the L' channel information, where the resulting channel information is provided 212 as the LO channel of the output signal.

Similarly, the second mixer 110 may mix 208 the RI and CI channels to form the R' channel, as $$R'=RI+mr*C. \qquad \text{(eqn. 2)}$$

The second phase shifter 114 may then provide 210 any desired phase shift to the R' channel information, where the resulting channel information is provided 212 as the RO channel of the output signal.

Although the generating 202 is shown as occurring at a particular location in the flow chart of FIG. 2, it will be apparent that the generating of mix coefficients may be accomplished at any time during the operation of the full-bandwidth downmixer 102 and/or may be accomplished at multiple intervals during operation of the full-bandwidth downmixer 102.

The mix coefficients ml and mr may be generated 202 at the same time or at separate times during operation of the full-bandwidth downmixer 102. Additionally, in some circumstances, it may be desirable to generate only a single mix coefficient, for example, ml or mr, to be utilized by the full-bandwidth downmixer 102. Further, or in the alternative, the generating 202 may be accomplished periodically during mixing of the input signal, for example, at some time interval (i.e., every 1.5 ms or 10 ms), or after processing a particular amount of input channel information (i.e., 64 samples or 640 samples of input channel information). Upon generating one or both of the mix coefficients ml and mr, the controller 106 may update the respective first and/or second mixer 108 and 110 with an updated value for one or both of the updated mix coefficients. Such updating of mix coefficient values may occur any time during downmixing of an input signal to the output signal.

Mix coefficient generation will be described generally with respect to the flow chart of FIG. 3. The flow charts and graphs of FIGS. 3-8 and 11-13 will be discussed in the context of FIG. 3, to describe mix coefficient generation for various circumstances.

Figure 3:
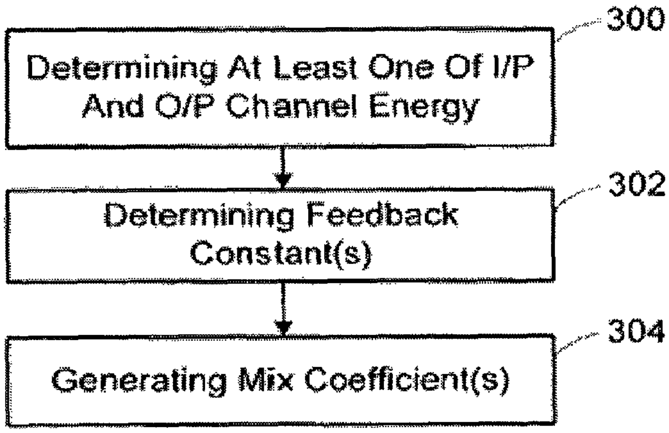
FIG. 3 is a flowchart illustrating generation of the mix coefficients of the downmixer of FIG. 1 and the downmixer of FIG. 9.

FIG. 3 is a flowchart illustrating the generating 202 of the mix coefficients, for example, the left and right channel mix coefficients ml and mr. The mix coefficient generation may occur, for example, at the test mixer 104 and controller 106. As shown in FIG. 3, at least one of an input and an output channel energy may be determined 300, for example, by the controller 106, using the test downmixer 104. The controller 106 may then determine 302 one or more feedback constants, for example, to smooth/stabilize mix coefficient value generation, especially in the presence of rapidly varying input channel information. The controller may then generate 304 mix coefficient(s), for example, the test mix coefficients ml' and mr' responsive to the channel energy and/or feedback constant(s). The mix coefficients of the full-bandwidth downmixer 102 may be updated with the values of the test mix coefficients.

As is described below, the controller 106 typically generates the mix coefficient values utilizing limited-bandwidth input signal information, for example, by filtering the LI, CI and/or RI channel information to accentuate audible frequencies, for example, in the 700-4000 Hz frequency range. The filtering may accentuate other frequency ranges. Filtering the input channel information may allow the generated mix coefficients to reflect more accurately the loudness of the sound as perceived by human listeners. Although the full-bandwidth downmixer 102 is typically a broad band downmixer capable of downmixing input signals over a broad range of frequencies, for example 20 Hz-20 KHz, human hearing may be particularly sensitive to the energy content in the middle frequencies, for example the 700-4000 Hz frequency range, and determining the mix coefficients responsive to the middle frequency range is advantageous as allowing loudness of the input signal to be preserved in frequencies to which human listeners are most sensitive. Alternatively, or in addition, the controller 100 may generate mix coefficient values using full-bandwidth input channel information (i.e., non-filtered input channel information).

Figure 4:
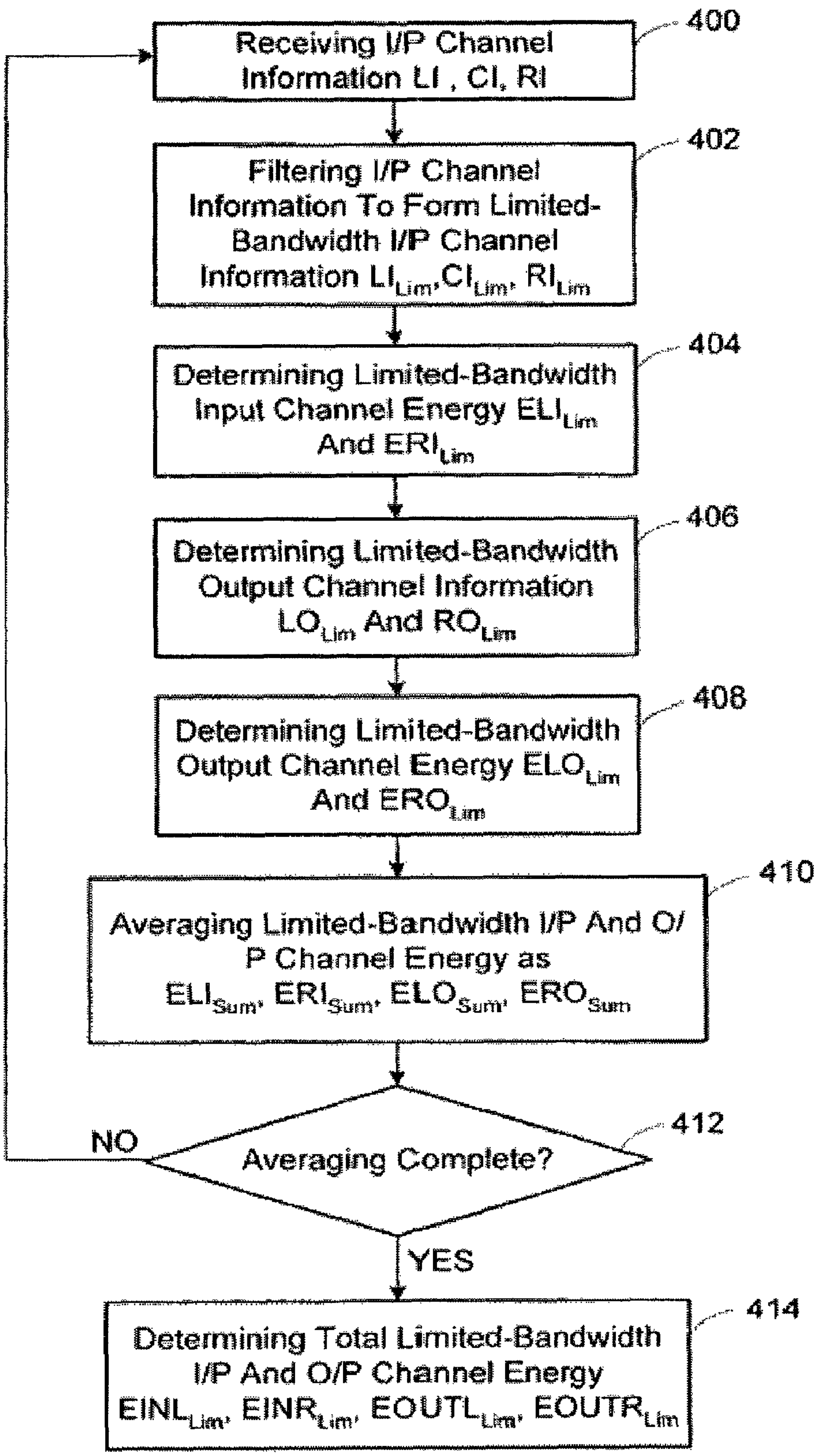
FIG. 4 is a flowchart illustrating the determining channel energy of FIG. 3 that may be used in downmixing a three channel input signal to a two channel output signal.
Figure 5:
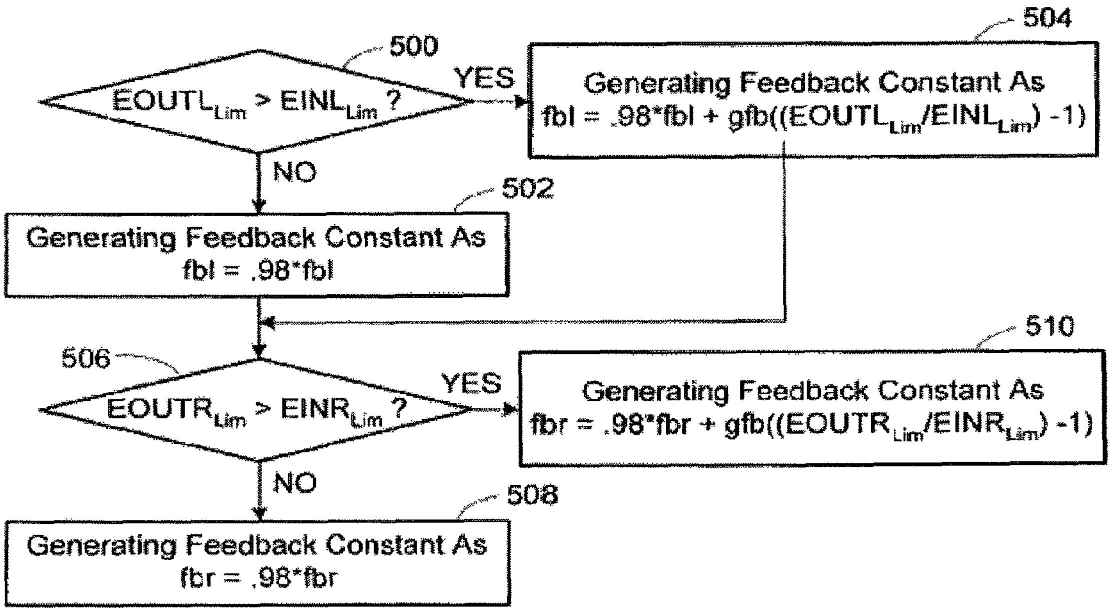
FIG. 5 is a flowchart illustrating the determining of a feedback constant of FIG. 3 that may be used in downmixing a three channel input signal to a two channel output signal.
Figure 6:
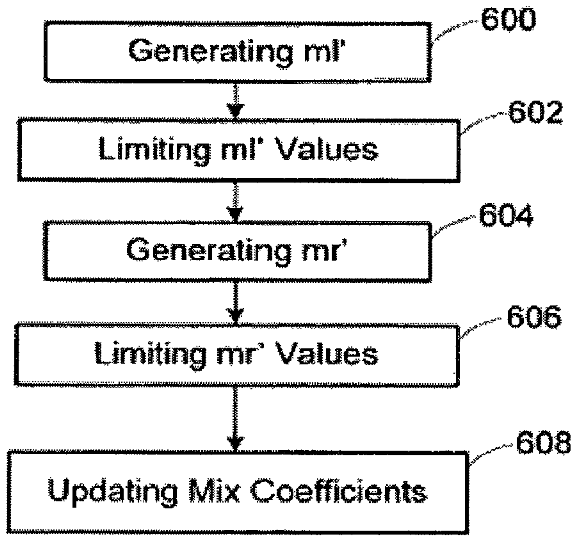
FIG. 6 is a flowchart illustrating the generating of channel mix coefficients of FIG. 3 that may be used in downmixing a three channel input signal to a two channel output signal.
Figure 7:
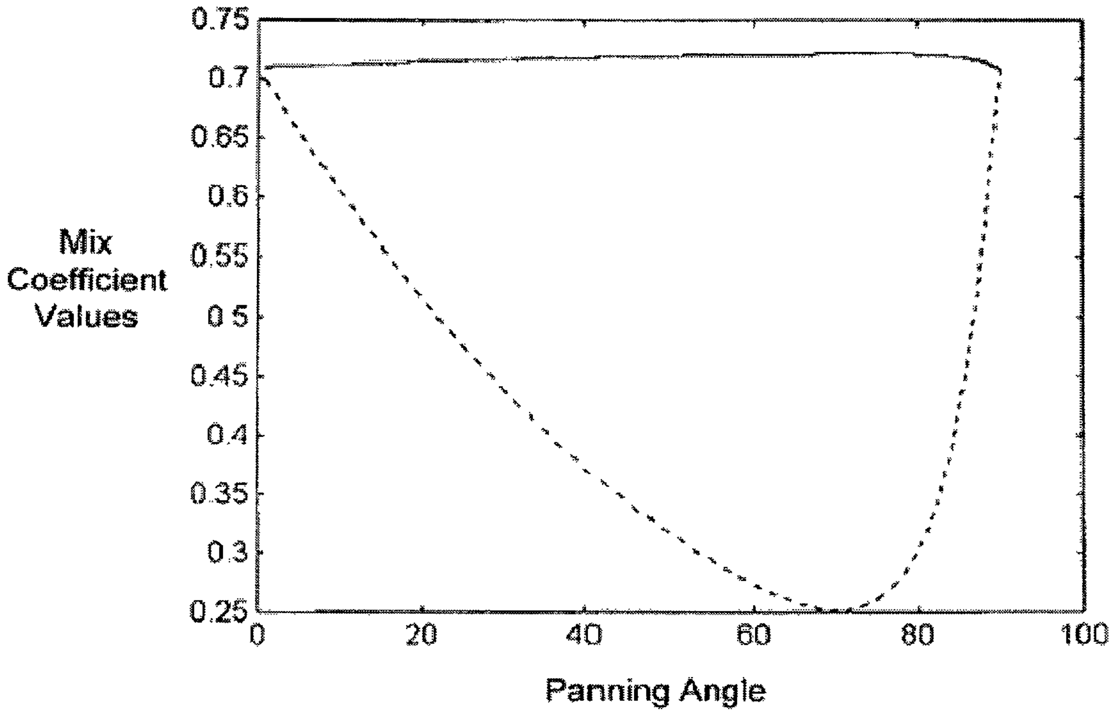
FIG. 7 is a graph of mix coefficients generated in accordance with the flow charts of FIGS. 4-6 for a single input signal panned from the center to left channel.
Figure 8:
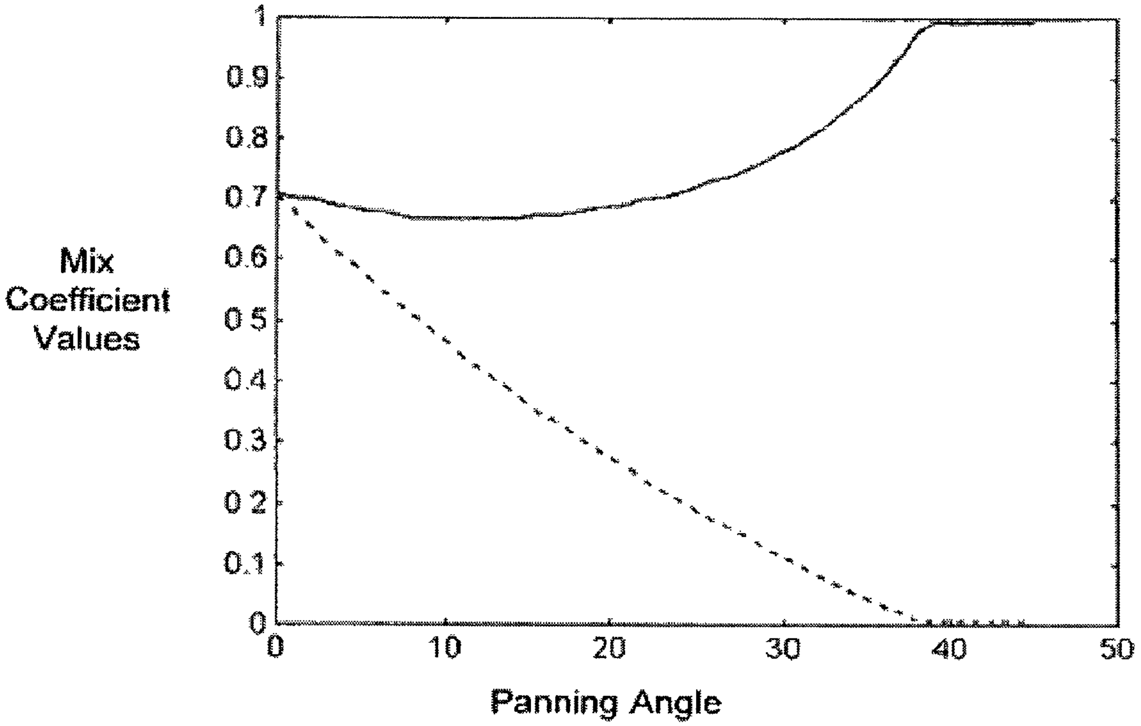
FIG. 8 is a graph of mix coefficients as a function of panning angle, derived experimentally to compensate for the subtle error in localization when a three channel signal is downmixed and reproduced through two channels.
Figure 11:
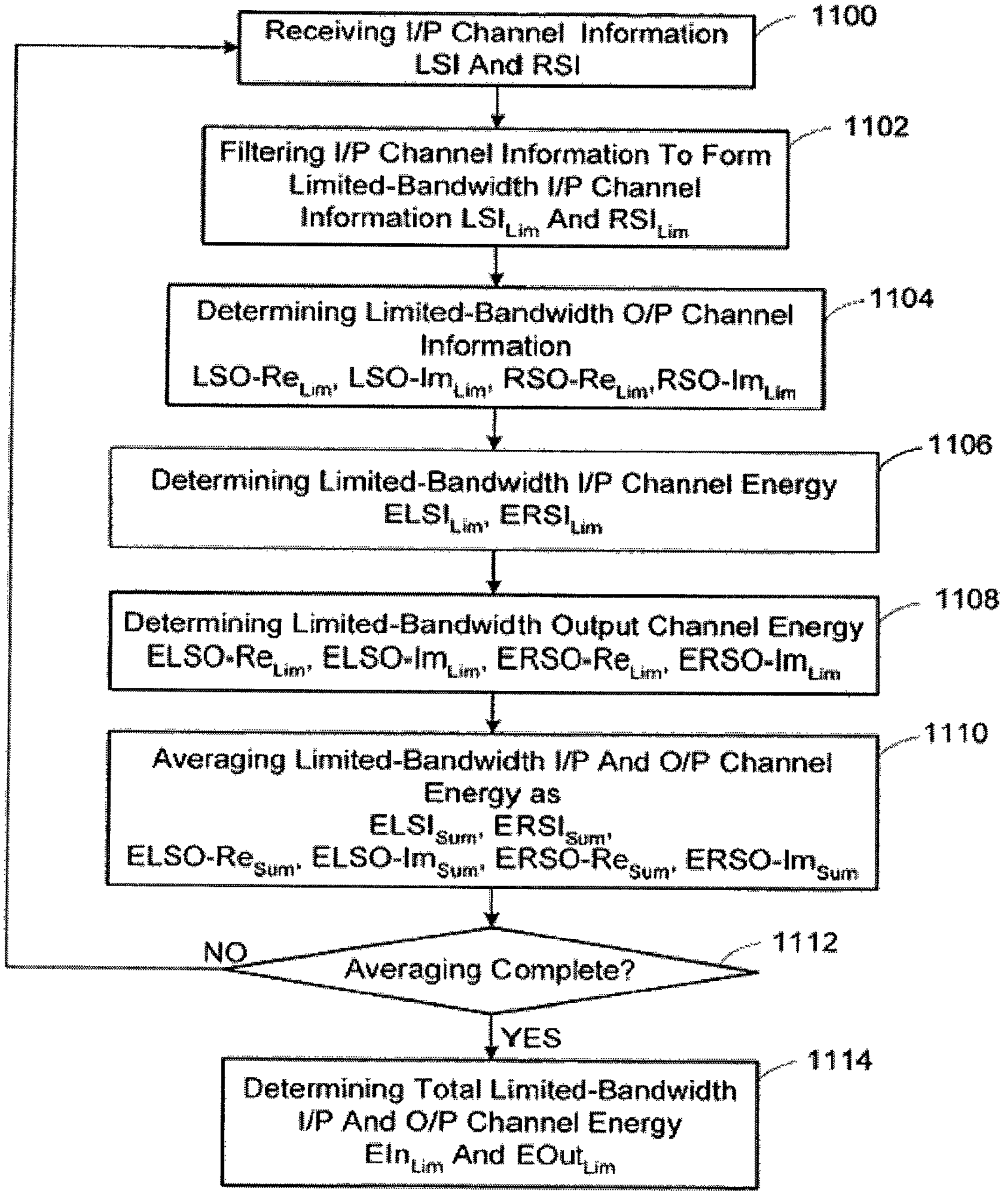
FIG. 11 is a flowchart illustrating determining I/P and O/P channel energy for generation of FIG. 3 for the downmixer of FIG. 9.
Figure 12:
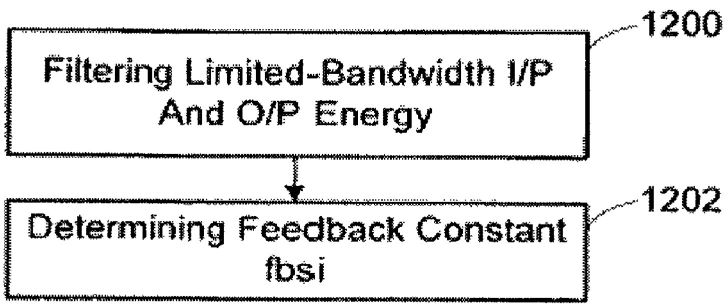
FIG. 12 is a flowchart illustrating the generating of at least one feedback constant of FIG. 3 for the downmixer of FIG. 9.
Figure 13:
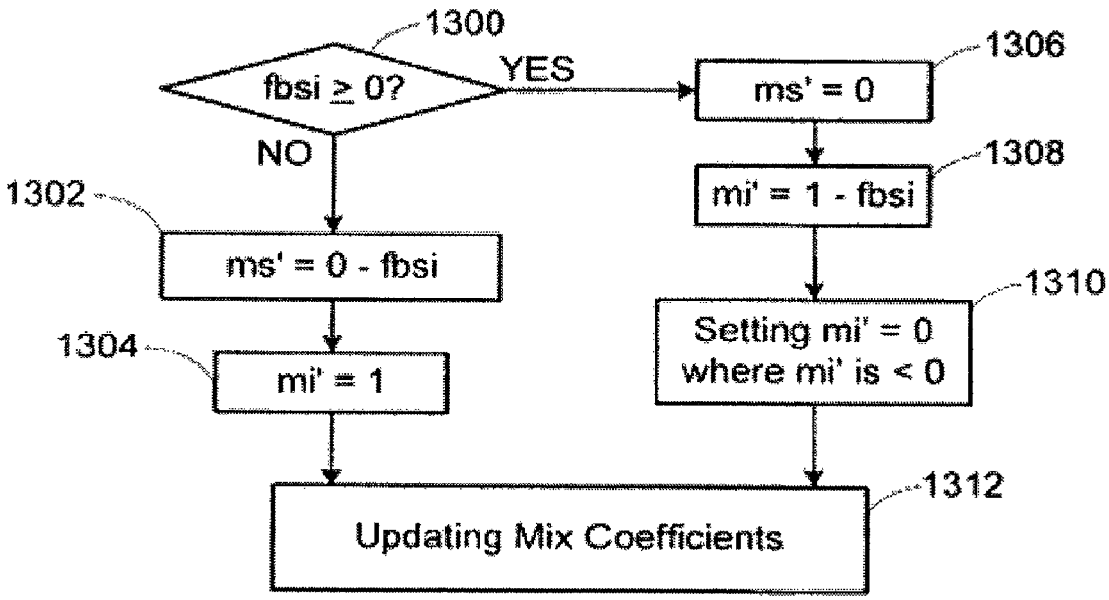
FIG. 13 is a flowchart illustrating the generating one or more mix coefficients of FIG. 3 for the downmixer of FIG. 9.

The generating of one or more mix coefficients will be discussed below for various situations. For example, FIGS. 4-6 are flowcharts illustrating operation of the controller 106 utilizing the test downmixer 104 for generating mix coefficients that may be used in downmixing a three channel input signal to a two channel output signal. FIG. 7 is a graph illustrating mix coefficients generated by the downmixer 100 in accordance with the flowcharts of FIGS. 4-6, with a particular input signal, such that energy and intended direction of the input signal is substantially preserved at the output signal. FIG. 8 is a graph illustrating ideal mix coefficients determined experimentally for the particular input signal, such that energy and intended direction of the input signal is substantially preserved at the output signal. An input signal scenario used in generating the graphs of FIGS. 7 and 8, may be utilized in generating predetermined mix coefficient values as described below. Other input signal scenarios may be used. FIGS. 11-13 illustrate mix coefficient generation for a downmixer capable of downmixing 5.1 input channels to two output channels.

FIGS. 4-6 are flow charts illustrating the mix coefficient generation of FIG. 3 that may be utilized in downmixing a three channel input signal to a two channel output signal.

FIG. 4 is a flow chart illustrating operation of the controller 106 and the test downmixer 104 in determining 300 at least one of an input and output channel energy. As shown in FIG. 4, input channel information is received 400 at the controller 106, including LI, CI and RI channel information. The input channel information 400 that is received may include one or more digital signal samples of audio information received as the input signal representing at least one of the LI, CI and RI channel information.

The input channel information may be filtered 402 by the controller 106 to form limited-bandwidth input channel information $LI_{Lim}$, $CI_{Lim}$ and $RI_{Lim}$. For example, the input channel information may be filtered to emphasize substantially audible frequencies of the input signals, such as in the 700 to 4,000 Hz frequency range. Limited-bandwidth input channel energy may then be determined 404 by the controller 106 for LI and RI channels, respectively, as $$ELI_{Lim}=LI_{Lim}^2+CI_{Lim}^2, \text{ and} \quad \text{(eqn. 3)}$$

$$ERI_{Lim}=RI_{Lim}^2+CI_{Lim}^2. \quad \text{(eqn. 4)}$$

A limited bandwidth LO and RO channel information $LO_{Lim}$ and $RO_{Lim}$ may be determined 406 at the test downmixer 104, as $$LO_{Lim}=LI_{Lim}+ml',*CI_{Lim}, \text{ and} \quad \text{(eqn. 5)}$$

$$RO_{Lim}=RI_{Lim}+mr'*CL_{Lim}. \quad \text{(eqn. 6)}$$

Limited-bandwidth output channel energy may determined 408 by the controller 106 for the LO and RO channels, respectively, as $$ELO_{Lim}=LO_{Lim}^2, \text{ and} \quad \text{(eqn. 7)}$$

$$ERO_{Lim}=RO_{Lim}^2. \quad \text{(eqn. 8)}$$

The limited-bandwidth input and output channel energy determined at 404 and 408 are typically averaged by the controller 106 over a plurality of samples of the input channel information received at the controller 106. The plurality of samples comprise a first tine period, that may include, for example, 64 samples of the received 400 input channel information.

The limited-bandwidth input and output channel energy is determined as total limited-bandwidth energy for the $LI_{Lim}$, $LO_{Lim}$, $RI_{Lim}$, and $RO_{Lim}$ channels that may be averaged 410 as $ELI_{Sum}$, $ELO_{Sum}$, $ERI_{Sum}$, $ERO_{Sum}$ channel energy, respectively, where $$ELI_{Sum}=ELI_{Sum}+ELI_{Lim} \quad \text{(eqn. 9)}$$

$$ERI_{Sum}=ERI_{Sum}+ERI_{Lim} \quad \text{(eqn. 10)}$$

$$ELO_{Sum}=ELO_{Sum}+ELO_{Lim}, \text{ and} \quad \text{(eqn. 11)}$$

$$ERO_{Sum}=ERO_{Sum}+ERO_{Lim}. \quad \text{(eqn. 12)}$$

Next, it may be determined 412 whether the averaging is complete. Where it is determined 412 that the averaging is not complete, flow returns to the receiving 400 input channel information as discussed above. However, where it is determined 412 that the first time period is complete, total limited-bandwidth input and output channel energy is determined 414 as total limited-bandwidth left and right channel input and output energy $EINL_{Lim}$, $EINR_{Lim}$, $EOUTL_{Lim}$, and $EOUTR_{Lim}$ respectively, where $$EINL_{Lim}=ELI_{Sum}+ECI_{Sum} \quad \text{(eqn. 13)}$$

$$EINR_{Lim}=ERI_{Sum}+ECI_{Sum} \quad \text{(eqn. 14)}$$

$$EOUTL_{Lim}=ELO_{Sum}, \text{ and} \quad \text{(eqn. 15)}$$

$$EOUTR_{Lim}=ERO_{Sum}. \quad \text{(eqn. 16)}$$

Upon determining at least one of an input and an output channel energy at 300, a feedback constant(s) may be determined 302 in accordance with the flowchart of FIG. 5.

FIG. 5 is a flowchart illustrating operation of the controller 106 in determining at least one feedback constant for generating mix coefficients to downmix a three channel input signal to two output channels. At 500 it is determined whether a total LO channel energy, $EOUTL_{Lim}$, is greater than a total limited-bandwidth LI channel energy, $EINL_{Lim}$. Where it is determined 500 that the total limited-bandwidth LO energy is not greater than the total limited-bandwidth LI energy, a left-channel feedback constant fbl may be generated 502 by the controller 106 as $$fbl=0.98*fbl. \quad \text{(eqn. 17)}$$

The left-channel feedback constant fbl may be initialized to a value of, for example, 1. Other initial values for the feedback constant may be utilized, for example, between 0 and 1. However, where it is determined 500 that the total limited-bandwidth LO channel energy is greater than the total limited-bandwidth LI channel energy, a left-channel feedback constant is generated 504 by the controller 106 as $$fbl=0.98fbl+gfb((EOUTL_{Lim}/EINL_{Lim})-1), \quad \text{(eqn. 18)}$$

where gfb may have a value of 0.04. The value for gfb may be selected experimentally with considerations, for example, that a high value of gfb may cause feedback loop instability, and a low value of gfb may substantially reduce or eliminate feedback action.

Upon generating 502 or generating 504 the feedback constant, it is determined 506 whether the total limited-bandwidth RO channel energy, $EOUTR_{Lim}$, is greater than the total limited-bandwidth RI channel energy, $EINR_{Lim}$. Where it is determined 506 that the total limited-bandwidth RO channel energy is not greater than the total limited-bandwidth RI channel energy, a right-channel feedback constant fbr may be generated 510 by the controller 106 as $$fbr=0.98*fbr. \quad \text{(eqn. 19)}$$

A value for fbr may be initially set as one. However, where it is determined that the total limited-bandwidth RO channel energy is greater than the total limited-bandwidth RI channel energy, the right-channel feedback constant fbr may be generated 508 by the controller 106 as $$fbr=0.98fbr+gfb((EOUTR_{Lim}/EINR_{Lim})-1). \quad \text{(eqn. 20)}$$

Although not shown, it will be apparent that the total limited bandwidth LO channel energy, the total limited bandwidth RO channel energy, the total limited-bandwidth LI energy and/or the total limited-bandwidth RI energy may be filtered, for example, low-pass filtered, before determining one or both of the feedback constants fbl and fbr. The filtering may be accomplished at the controller 106, for example, as low-pass filtering. The low pass filtering may utilize, for example, a 70 ms time constant. Other time constants may be utilized. Further, it will be apparent that at least some of the filtering may not be carried out by the controller 106, but rather the filtering may be accomplished by one or more filters embodied as hardware devices.

Returning to FIG. 3, upon determining 302 the feedback constant(s), one or more test mix coefficients may be generated 304 by the controller 106 as described with respect to the flowchart of FIG. 6. As shown in FIG. 6, a test left channel mix coefficient ml' may be generated 600 by the controller 106 as $$ml'=0.71+fbl*lf+fbr*rf, \quad \text{(eqn. 21)}$$

where fbl and fbr have values as determined above with respect to FIG. 5, lf has a value of −1 and rf has a value of 0.3. The values for lf and rf may be used to bias the test mix coefficients ml' and mr' respectively. The test mix coefficients may be biased using lf and rf, for example, to compensate for a subtle error in localization (i.e., intended direction) when a three channel signal is downmixed and reproduced through two channels. Other values for lf and rf may be utilized.

After generating 600 a value for the test left channel mix coefficient ml', the value for the test mix coefficient ml' may be limited 602 to a value between 0 and 1. For example, where ml' is determined to be less than 0, ml' is set to a value of 0, and where ml' is determined to be greater than 1, ml' is set to a value of 1.

A test right channel mix coefficient mr' may then be generated 604 by the controller 105 as $$mr'=0.71+fbl*rf+fbr*lf, \quad \text{(eqn. 22)}$$

where fbl, fbr, rf and lf have values as discussed above with respect to the generating 600.

After generating the test mix coefficient mr', a value for mr' may be limited 606 to a value between 0 and 1. For example, where the test mix coefficient mr' is determined to be less than 0, mr' may be set to a value of 0, and where the test mix coefficient mr' is determined to be greater than 1, mr' may be set to a value of 1.

The test mixer down mixer left and right mix coefficients ml' and mr' have been determined, for example, using the feedback constant fb, to substantially preserve the energy and intended direction of the limited-bandwidth input signal received at the test down mixer 104 in the output signal of the test mixer. As energy and intended direction are substantially preserved at the test downmixer 104 using the test mix coefficients, the test mix coefficient values, if used in the full-bandwidth downmixer 102, will allow the energy and intended direction of the input signal at the full-bandwidth downmixer to be substantially preserved in the output signal. The test mix coefficients values ml' and mr' may be used to update 608 the mix coefficient values ml and mr used in the full-bandwidth downmixer 102.

The updating 608 may be accomplished by the controller 106 updating the left channel mix coefficient ml of the first mixer 102 with the value of the test left channel mix coefficient ml', by replacing the value of ml with the value of ml'. Similarly, the right channel mix coefficient mr may be updated by the controller 106 updating the right channel mix coefficient mr of the second mixer 104 with the value of the test right channel mix coefficient mr', by replacing the value of mr with the value of mr'.

In addition, or in the alternative, the left and right channel mix coefficients may be updated 608 by the controller 106 by smoothing the mix coefficients before they are used in the full-bandwidth downmixer that actually produces to output signals. This smoothing may occur in the tine between calculation of new values for ml and mr. For example, about every one-half of a millisecond the value of ml in the full bandwidth downmixer may be altered (i.e., updated) in such a way as to bring it closer to the calculated value ml'. The change is made so that the value of ml' is reached by ml in the full bandwidth downmixer before another value of ml' is determined at the test downmixer 104. The same may be true with respect to updating the mix coefficient value mr with the test mix coefficient value mr'.

In this way, the left and right channel mix coefficients ml and mr may be generated 304 for the full-bandwidth downmixer 102.

FIG. 7 is a graph of mix coefficients that may be generated by the downmixer 100 in accordance with the flow charts of FIGS. 4-6 for a single input signal presented to the CI and LI channels. The graph of FIG. 7 is generated by the single signal panned smoothly between the LI and CI channels, where the intended direction of the input signal is precisely known. FIG. 8 is a graph of mix coefficients as a function of panning angle derived experimentally to compensate for a subtle error in localization when a three channel signal is downmixed and reproduced through two channels. The graph of FIG. 8 illustrates a calculated ideal case, where there is a single signal panned smoothly between the LI and CI channels, and where the intended direction of the input signal is precisely known. Left channel mix coefficient ml values are designated in FIGS. 9 and 10 using a dashed line, and right channel mix coefficient mr values are designated in FIGS. 9 and 10 using a solid line.

It will be apparent that mix coefficients, for example, ml and mr, may be generated 202 (FIG. 2), as predetermined values responsive to input channel energy, and need not be generated in real-time. Such a scheme may utilize frequency limited input and output energy from a test downmixer as inputs to one or more one-dimensional or two-dimensional look-up tables. As is apparent from the preceeding explanation for the operation of a downmixer, the mix coefficient may depend on the ratio of input energy to the output energy. Look-up tables where the input to the table is the output/input energy ratio as determined by a test downmixer may be used to derive mix coefficients such as ml and mr directly.

To generate the predetermined mix coefficients stored in such look-up tables, for example, the mix coefficients ml and mr, the controller 106 and a downmixer, for example, the downmixer 102 or the test downmixer 104 may be utilized, where an input signal for a particular input signal scenario (i.e., having characteristics of a smooth pan from CI to LI, for example as was used to generate the graph of FIG. 8) may be processed by the downmixer to determine a ratio between an output energy and an input energy resulting from the input signal scenario. The downmixer and controller 106 may then be utilized to determine at least one mix coefficient, for example, the mix coefficients ml and mr that may be utilized with the particular input signal scenario such that signal energy in an intended direction of the input signal is substantially preserved at the output (downmixed) signal. The mix coefficients may be generated, for example, as discussed above with respect to FIGS. 4-6.

The ratio between the output and input energies for that particular input signal scenario may be stored in a tabular format at the storage device 120. Such a tabular format may include, for example, the mix coefficients ml and mr indexed by the ratio of output to input energy for one or more input signal scenarios. For example, a mix coefficient table for ml may be provided, and indexed by a ratio of output to input signal energy for particular input signal scenarios. Similarly, a mix coefficient table for mr may be provided and indexed by the ratio between output and input signal energy for the particular scenario.

In operation, the controller 106 may detect a particular input signal scenario, determine a ratio between output and input energies, and based on the ratio, lookup values for at least one mix coefficient, for example, the mix coefficients ml and mr to be used by the downmixer to downmix the signal for that input signal scenario. The mix coefficient(s) retrieved allow that input energy and intended direction of the input signal to be substantially preserved at the output signal. The controller may update mix coefficient values in the downmixer with the retrieved mix coefficient values, for example, in a similar fashion as discussed above with respect to the updating 608 of FIG. 6.

In this way, a library of predetermined mix coefficient scenarios may be determined, and for example, stored at the storage device 120. The library may include mix coefficient tables for mix coefficients, where, for example, each mix coefficient table provides one or more mix coefficients indexed by a ratio of output to input energy. Other mix coefficient table configures may be possible. The mix coefficient library may be accessed by the controller in retrieving mix coefficient values for a particular input signal scenario.

The predetermined mix coefficient generation may be utilized in conjunction with the mix coefficient generation described above with respect to FIGS. 6-8. For example, the controller may attempt to identify whether the input signal meets requirements for a particular input signal scenario for which the mix coefficient library includes a predetermined mix coefficient(s). Where the controller 106 determines that the input signal fits one of the input signal scenarios for which mix coefficients are stored, the controller may generate mix coefficients by retrieving appropriate mix coefficients from the mix coefficient library as described above. However, where the controller 106 determines that the input signal does not meet criteria for a stored input signal scenario, the controller may, in conjunction with the test mixer 104, generate mix coefficients for the downmixer.

Additionally, or in the alternative, the controller may employ a learning algorithm, allowing it to identify characteristics for input signal scenarios, for which predetermined mix coefficients would be useful (i.e., input signal scenarios that are repeatedly received in an input signal at the downmixer). In such circumstances, the controller may be capable of using the test downmixer to determine mix coefficient values for the particular input signal scenario, and stored in the storage device 120. Upon subsequent recognition of the input signal scenario, the controller 106 may generate mix coefficients for the scenario by retrieving the mix coefficients from the mix coefficient table.

By generating mix coefficient values by retrieving mix coefficients as described above, the controller may generate mix coefficient values that may allow input signal energy and intended direction to be preserved in the output signal with less of a demand on downmixer resources than may be required to generate the mix coefficients as described above with respect to FIGS. 4-6. Downmixer resources may be freed-up for use by the downmixer in other operations.

Figure 9:
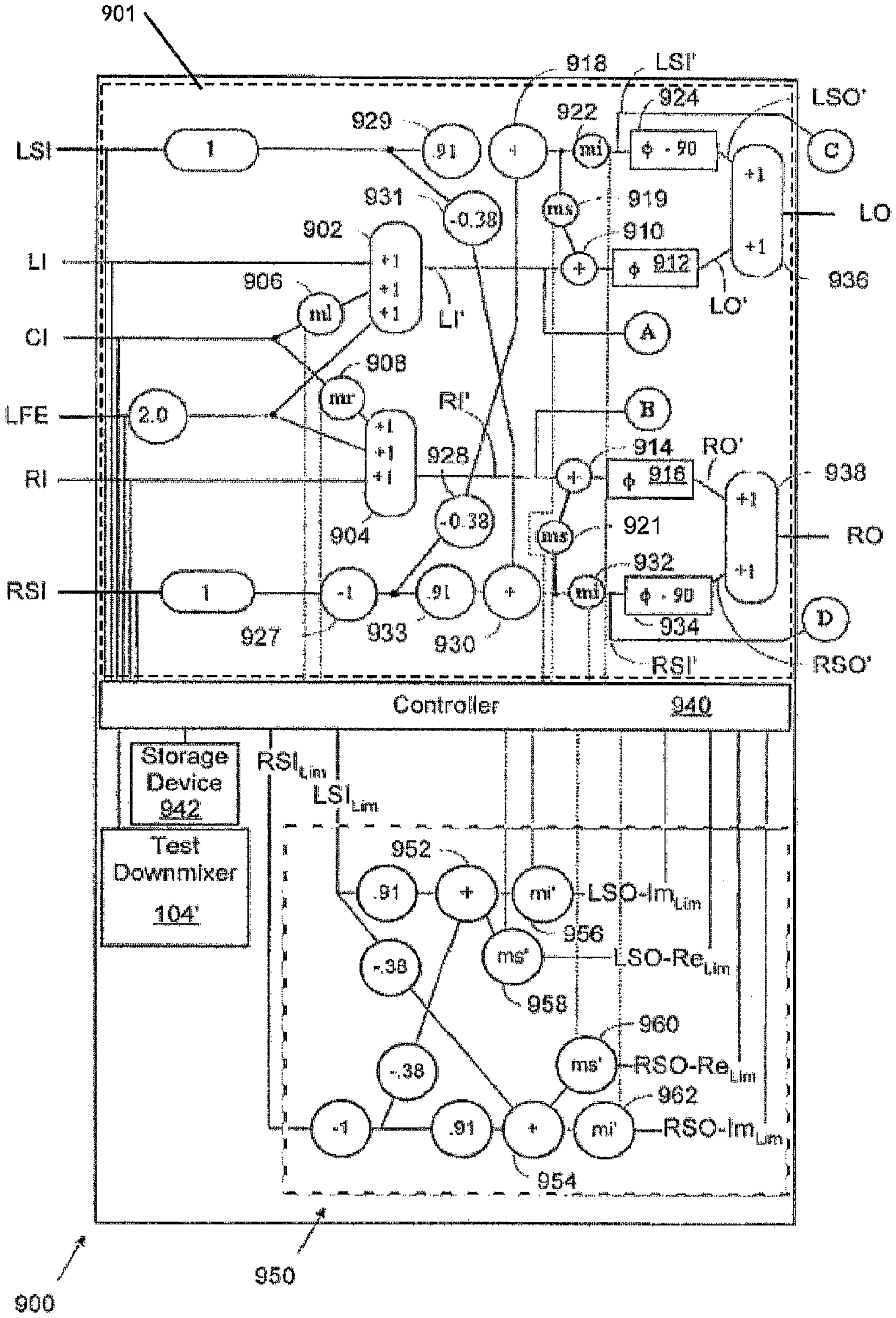
FIG. 9 is a functional block diagram of a downmixer device for downmixing a 5.1 channel input signal to a two channel output signal.

FIG. 9 is a block diagram of a downmixer 900 in accordance with the invention. The downmixer 900 is capable of receiving a multi-channel input signal including more than two channels and down-mixing the multi-channel input signal to an output signal including a number of channels less than the number of channels of the input signal. The downmixer 900 includes a full-bandwidth downmixer 901 for downmixing the 5.1 channel input signal to the two-channel output signal utilizing at least one of the front channel left and right mix coefficients ml and mr, and the surround channel mix coefficients mi and ms, such that the energy and intended direction of the input signal is substantially preserved in the output signal. The downmixer 900 further includes a test downmixer 104' which may be utilized in conjunction with a controller 940 in generating front channel left and right mix coefficients ml and mr. As the front channel mix coefficients ml and mr may be generated in a similar fashion as the mix coefficients ml and mr by the test mixer 104 and controller 106 of FIG. 1, operation of the test mixer 104' will not be discussed in detail. The downmixer 900 may further include a test downmixer 950 which may be utilized with the controller 940 in generating one or more of the surround mix coefficients, for example, the surround mix coefficients mi and ms, such that signal energy and intended direction of the input signal is substantially preserved in the output signal of the full-bandwidth downmixer 901.

As shown in FIG. 9, a front left input (LI), front center input (CI), front right input (RI), low frequency (LFE), left surround input (LSI) and right surround input (RSI) channels may be received at the downmixer 900. The downmixer 900 is capable of down mixing the 5.1 input channels of the input signal to an output signal including, for example, two output channels, a left output (LO) and right output (RO) channel.

The full-bandwidth downmixer 901 may include a first LI mixer 902 for mixing the LI, CI and LFE channels and a first RI mixer 904 for mixing the RI, CI, and LFE input channels of the input signal. Multipliers 906 and 908 may be utilized to multiply the CI input signal by respective front left and right channel mix coefficients ml and mr before mixing the CI channel at the first LI mixer 902 and first RI mixer 904. A second LI mixer 910 may allow components of one or both surround channels LSI and RSI to be added to the LI' channel information, and a LI phase shifter 912 may be provided to accomplish any desired phase shift to form LO' channel information. Similarly, a second RI mixer 914 may be provided for adding components of one or both surround channels LSI and RSI to the RI' channel information, and a RI phase shifter 916 may be provided to accomplish any desired phase shift to form RO' channel information.

An LSI mixer 918 may be provided to add a component of the RSI channel to the LSI channel, and a multiplier 922 may be provided for accounting for a LSI mix coefficient, for example a mi surround mix coefficient corresponding to an imaginary component LSI' of the LO channel. A LSI phase shifter 924 may be provided to accomplish any desired phase shift to the LSI' channel information to form the LSO' channel information. Similarly, a RSI mixer 930 may be provided for adding a component of the LSI channel to the RSI channel, a multiplier 932 allows for the mi surround mix coefficient to be accounted for, and a RSI phase shifter 934 may be utilized to provide any desired phase shift to the RSI' channel information to form RSO' channel information.

Multipliers 919 and 921 may be provided to account for a ms surround mix coefficient. For example, the ms surround mix coefficient may be utilized to control an amount of the LSI and RSI channels that are added to the respective front channel output path, for example, to the LI' and LO' signals, respectively.

A LO mixer 936 may be provided to mix the LSO' and LO' channel information to form an output channel LO of the output signal. Similarly, a RO mixer 938 may be utilized to mix the RO' and RSO' channel information to form the RO output channel of the output signal.

The test downmixer 950 may include a first test adder 952 and a second test adder 954. The first test adder 952 is coupled with a first test mixer 956 and a second test mixer 958, to account for test surround mix coefficients mi' and ms' at the test mixer 950. Similarly, the second test adder 954 is further coupled with a third test mixer 960 and a fourth test mixer 962 capable of accounting for the test surround mix coefficients ms' and mi' respectively in the test downmixer 950.

The controller 940 may be coupled with one or more of the input channels, for example, the LSI, LI, CI, LFE, RI and RSI input channels, as well as with one or more of the multipliers 906, 908, 919, 921, 922 and 932 of the full-bandwidth downmixer 901, for generating and/or updating one or more of the mix coefficients ml, mr, ms, and mi, utilizing the test downmixers 140' and 950. To reduce confusion, the coupling between the controller 940 and the multipliers 906, 908, 919, 921, 922 and 932 are shown with dotted lines.

The first test adder 952 is capable of receiving a limited-bandwidth (i.e., filtered) LSI channel information as $LSI_{Lim}$, received at the test downmixer 950 and attenuated by a factor of 0.91. The first test adder 952 is further capable of receiving a RSI limited-bandwidth channel information as $RSI_{Lim}$ that has been inverted, and multiplied by a cross-correlation factor −0.38, and adding that with the attenuated $LSI_{Lim}$ signal. The resulting channel information from the first test adder 952 may then be mixed at the first and second test mixers 956 and 958 in accordance with test surround mix coefficients mi' and ms', to generate test mixer 950 output channel information LSO-$Im_{Lim}$ and LSO-$Re_{Lim}$ respectively. Similarly, the second test adder 954 may be capable of adding an inverted $RSI_{Lim}$ channel information, attenuated by a factor of 0.91, with $LSI_{Lim}$ channel information that has been multiplied by a cross-correlation factor −0.38. The resulting channel information may then be mixed at the third and fourth test mixers 960 and 962 in accordance with the test surround mix coefficients ms' and mi' to generate the test mixer 950 output channel information RSO-$Re_{Lim}$ and RSO-$Im_{Lim}$ respectively.

The controller 940 may further be coupled with the test downmixer 104', and the first, second, third and fourth test mixers 956, 958, 960 and 962. The controller 940 may be capable of receiving one or more of the LI, CI, RI, LFE, LSI and RSI channel information of the input signal, and determining limited-bandwidth (i.e., filtered) channel information, for example, $LSI_{Lim}$ and $RSI_{Lim}$ for use in the test downmixer 950. The controller 940 may further be capable of receiving output channel information, for example the output channel information LO and RO from the full-bandwidth downmixer 901, and/or the limited-bandwidth output channel information LSO-$IM_{Lim}$, LSO-$RE_{Lim}$, RSI-$RE_{Lim}$ and RSI-$IM_{Lim}$ channel information from the test downmixer 950, and generating one or more mix coefficients, for example, the mix coefficients ml, mr, mi and ms using the test downmixer 950, as described below. The controller 940 may further be coupled with a storage device 942 providing a working memory and a program memory for the controller 940. Operation of the downmixer 900 will be discussed with reference to the flow chart of FIG. 10.

Figure 10:
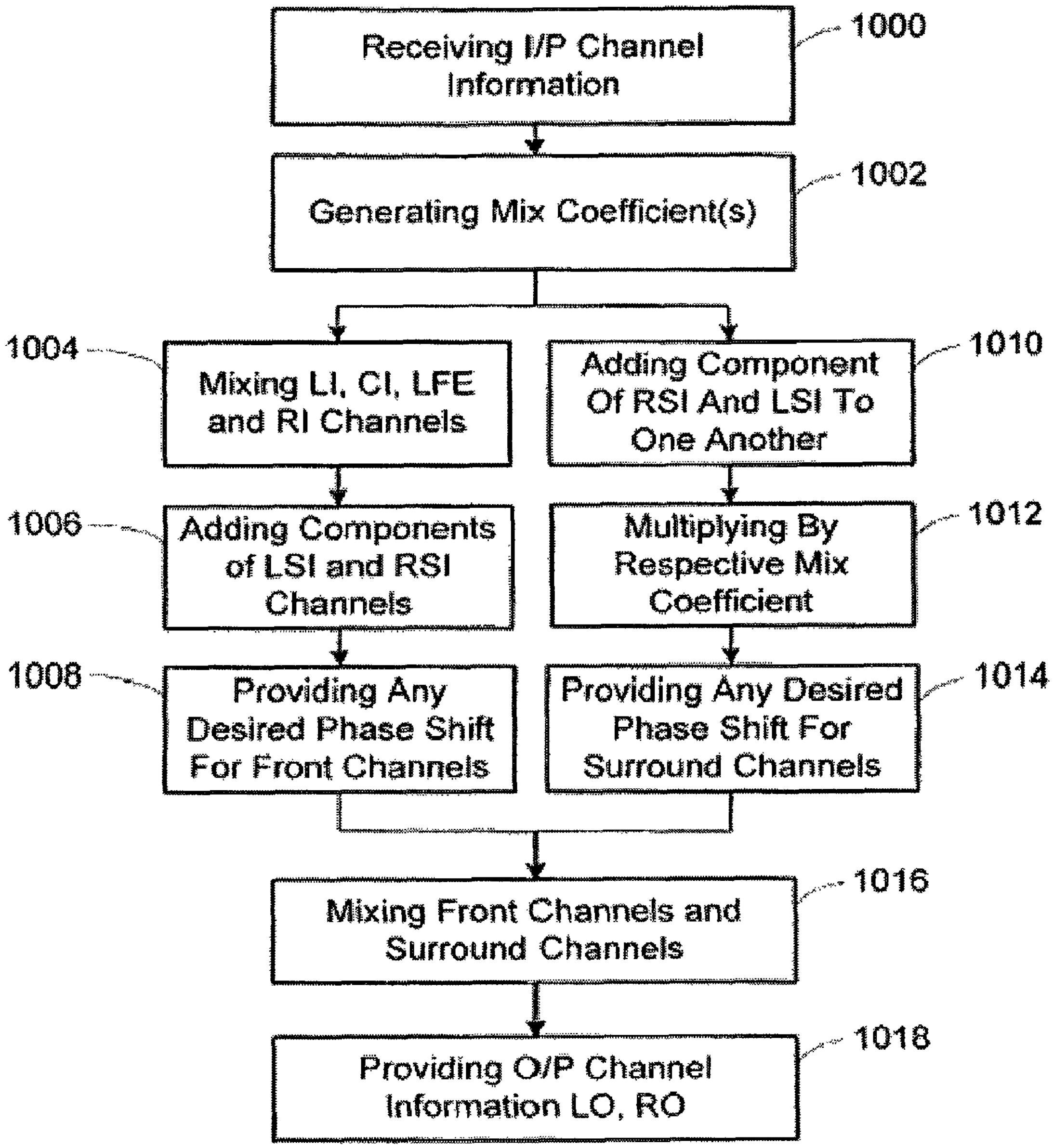
FIG. 10 is a flowchart illustrating operation of the downmixer device of FIG. 9.

FIG. 10 is a flow chart illustrating operation of the downmixer 900 of FIG. 9. As shown in FIG. 10, input channel information is received 1000, for example, including information for the LSI, LI, CI, LFE, RI and RSI channels of the input signal. One or more mix coefficients may be generated 1002 using the controller 940 and the test downmixer 950, responsive to at least one of the input channel information as will be described below with reference to FIGS. 11-13 and 14-17. The LI, CI, LFE and RI channel information, may be mixed 1004 in a similar fashion as discussed above with respect to FIG. 3 and FIGS. 4-6. Further, information of the LFE channel may be amplified, for example, by a factor of two, before being mixed at the first LI and RI mixers 902 and 904, respectively. Additionally, the CI channel information may account for one or more mix coefficients, for example, front left and right channel mix coefficients ml and mr, using the multipliers 906 and 908, before the CI channel information is mixed at the first LI and RI mixers 902 and 904. The first LI mixer 902 generates LI' channel information and the first RI mixer 904 generates RI' channel information. For example, the LI' and RI' channel information may be utilized as a left and right output signal for the purpose of generating the mix coefficients ml and mr, in a similar fashion as discussed above with respect to FIGS. 3-11.

Components of the LSI and RSI channels may be added 1006 to the LI' and RI' channel information using the second LI mixer 910 and second RI mixer 914, respectively. For example, LSI channel information may be multiplied with a mix coefficient ms at multiplier 919, before being mixed with the LI' channel information at the second LI mixer 910. Similarly, the RSI channel information may be multiplied by a mix coefficient ms at a multiplier 919 before being mixed with the RI' channel information at the second RI mixer 914. Any desired phase shift for the front channel information may be provided 1008, by the LI phase shifter 912 and the RI phase shifter 916, to form LO' and RO' channel information respectively.

Concurrently with, or subsequent to the mixing 1004, adding 1006 and providing 1008, components of the RSI and LSI channels may be added 1010 to one another. For example, the RSI channel may be inverted at an inverter 927, and multiplied at a multiplier 928, by a cross-correlation factor, for example, −0.38, and mixed with the LSI channel information at the LSI mixer 918. Before mixing at the LSI mixer 918, the LSI channel information may be attenuated by some factor, for example 0.91 at a multiplier 929. In a similar fashion, a component of the LSI channel may be added to the RSI channel using a multiplier 931, by multiplying the LSI channel information by a cross-correlation factor, for example −0.38, and mixed with the RSI signal at the RSI mixer 930. Before mixing at the RSI mixer, the RSI channel may be attenuated by a factor, for example 0.91, at a multiplier 933.

A respective mix coefficient may be accounted for by multiplying 1012 the channel information from respective LSI mixer 918 and RSI mixer 930 by the mix coefficient mi to form the LSI' and RSI' channel information respectively.

Any desired phase shift may be provided 1014 for the surround channels. For example, a phase shift may be provided to the LSI' channel information at the LSI phase shifter 924 to form the LSO' channel information, where the phase is offset by 90 degrees with respect to that provided by the LI phase shifter 912. Similarly, the RSI' channel information may be shifted in phase at the RSI phase shifter 934 to form the RSO' channel information, where the phase shift is offset by 90 degrees with respect to that applied by the RI phase shifter 916.

The surround channel information and front channel information may then be mixed 1016. For example, the LSO' channel information may be mixed with the LO' channel information at the LO mixer 936 to form the LO channel of the output signal, and the LO channel may be provided 1018. Similarly, the RSO' channel information may be mixed with the RO' channel information at the RO mixer 938 to form the RO channel of the output signal, and the LO channel may be provided 1018.

Although the generating 1002 mix coefficients has been shown at a particular location in the flow chart of FIG. 10, it will be apparent that one or more mix coefficients, for example ml, mr, mi, and ms may be generated by the controller 940 at any time during operation of the downmixer 900. Further, the mix coefficients need not all be generated at the same time, and may be generated at different times during operation of the downmixer 900. The front left and right channel mix coefficients ml and mr may be generated using the controller 940 and the test downmixer 104' in a similar fashion as discussed above with respect to FIG. 3 and FIGS. 4-6, and will not be discussed in detail. In addition, the mix coefficient generation for the front channel mix coefficients ml and mr may be accomplished independently from the mix coefficient generation of the surround mix coefficients mi and ms.

The generation of the surround mix coefficients mi and ms may be generated by the controller 940 using the test mixer 950, for example, as discussed with respect to the flow chart of FIG. 3, and the flow charts of FIGS. 11-13 and 14-17. As shown in FIG. 3, at least one of an input and an output channel energy is determined 300. At least one of the input and output channel energy determination 300 will be discussed with respect to the flow chart of FIG. 11.

FIG. 11 is a flow chart illustrating operation of the controller 940 in determining input channel energy, used in generation of at least one test surround mix coefficient, for example, test surround mix coefficients mi' and ms'. As shown in FIG. 11, input channel information for the LSI and RSI channels are received 1100 at the controller 940, for example as signal samples of the input signal, in a similar fashion as discussed above with respect to the receiving 400 of FIG. 4.

The input channel information may be filtered 1102 by the controller 940 to generate limited-bandwidth input channel information $LSI_{Lim}$ and $RSI_{Lim}$, channel information. For example, the input channel information may be filtered 1102 utilizing a finite impulse response filter, for example, emphasizing frequencies and the 700-4000 Hz frequency range, in a similar fashion as discussed above with respect to filtering 402 of FIG. 4.

Limited-bandwidth output channel information may be determined 1104 at the test downmixer 950 as LSO real and imaginary channel information, $LSO\text{-}Re_{Lim}$ and $LSI\text{-}Im_{Lim}$, and RSO real and imaginary channel information, $RSO\text{-}Re_{Lim}$ and $RSO\text{-}Im_{Lim}$, as $$LSO\text{-}Re_{Lim}=ms'*LSI_{Lim} \quad \text{(eqn. 23)}$$

$$LSO\text{-}Im_{Lim}=mi'*(0.91*LSI_{Lim}+0.38*RSI_{Lim}) \quad \text{(eqn. 24)}$$

$$RSO\text{-}Re_{Lim}=ms'*RSI_{Lim}, \text{ and} \quad \text{(eqn. 25)}$$

$$RSO\text{-}Im_{Lim}=mi'*(-0.91*RSI_{Lim}-0.38*LSI_{Lim}), \quad \text{(eqn. 26)}$$

where ms' and mi' are initialized to a value of 0.7. A limited-bandwidth input channel energy may be determined 1106 by the controller 940 for LSI energy and RSI energy, as $ELSI_{Lim}$ and $ERSI_{Lim}$, respectively, where $$ELSI_{Lim}=ELSI^2_{Lim}, \text{ and} \quad \text{(eqn. 27)}$$

$$ERSI_{Lim}=ERSI^2_{Lim}. \quad \text{(eqn. 28)}$$

Limited-bandwidth output channel energy may be determined 1108 by the controller 940, as real and imaginary components of LSO channel energy, $ELSO\text{-}Re_{Lim}$ and $ELSO\text{-}Im_{Lim}$, respectively, and real and imaginary of RSO channel energy, $ERSO\text{-}Re_{Lim}$ and $ERSO\text{-}Im_{Lim}$, respectively, where $$ELSO\text{-}Re_{Lim}=LSO\text{-}Re^2_{Lim} \quad \text{(eqn. 29)}$$

$$ELSO\text{-}Im_{Lim}=LSO\text{-}Im^2_{Lim} \quad \text{(eqn. 30)}$$

$$ERSO\text{-}Re_{Lim}=RSO\text{-}Re^2_{Lim}, \text{ and} \quad \text{(eqn. 31)}$$

$$ERSO\text{-}Im_{Lim}=RSO\text{-}Im^2_{Lim}. \quad \text{(eqn. 32)}$$

The limited-bandwidth input and output channel energy may be averaged 1110 by the controller 940 in a similar fashion as discussed above, for example, with respect to the averaging 410, as LSI, RSI, LSO and RSO average energy $ELSI_{Sum}$, $ERSI_{Sum}$, $ELSO_{Sum}$, and $ERSO_{Sum}$, respectively, where $$ELSI_{Sum}=ELSI_{Sum}+ELSI_{Lim} \quad \text{(eqn. 33)}$$

$$ERSI_{Sum}=ERSI_{Sum}+ERSI_{Lim} \quad \text{(eqn. 34)}$$

$$ELSO_{Sum}=ELSO_{Sum}+ELSO\text{-}Re_{Lim}+ELSO\text{-}Im_{Lim}, \text{ and} \quad \text{(eqn. 35)}$$

$$ERSO_{Sum}=ERSO_{Sum}+ERSO\text{-}Re_{Lim}+ERSO\text{-}Im_{Lim}. \quad \text{(eqn. 36)}$$

It may be determined 1112 whether the averaging is complete. Where the averaging is not complete, flow returns to the receiving 1100. Where it is determined 1112 that the averaging is complete, a total limited-bandwidth input and output channel may be determined 1114 by the controller as $EIn_{Lim}$ and $EOut_{Lim}$, respectively, as $$EIn_{Lim}=ELSI_{Sum}+ERSI_{Sum}, \text{ and} \quad \text{(eqn. 37)}$$

$$EOut_{Lim}=ELSO_{Sum}+ERSO_{Sum}. \quad \text{(eqn. 38)}$$

Returning to FIG. 3, upon determining 300 at least one of the input and output channel energy, a feedback constant may be determined 302. The determining 302 of the feedback constant will be discussed with respect to the flow chart of FIG. 12.

FIG. 12 is a flow chart illustrating operation of the controller 940 in determining a feedback constant fbsi that may be used in determining a test mix coefficient(s) for the test downmixer 950, for example, the test surround channel mix coefficients mi' and ms'. As shown in FIG. 12, the limited-bandwidth input and output energy, for example, determined at 1114, may be filtered 1200 by the controller 940 to form filtered input and output limited-bandwidth energy $SIN_{Lim}$ and $SOUT_{Lim}$, as $$SIN_{Lim}=0.98*SIN_{Lim}+0.02*EIN_{Lim}, \text{ and} \quad \text{(eqn. 39)}$$

$$SOUT_{Lim}=0.98*SOUT_{Lim}+0.02*EOUT_{Lim}. \quad \text{(eqn. 40)}$$

Such filtering may be low pass filtering, and may be accomplished utilizing a filter having, for example a 70 ms time constant. Other time constants may be utilized.

A feedback constant fbsi may be determined 1202 by the controller 940, as $$fbsi=0.98*fbsi+gfb*((SOUT_{Lim}/SIN_{Lim})-1), \quad \text{(eqn. 41)}$$

where gfb has a value of 0.04. Considerations for a value of gfb to be used may be similar to as discussed above with respect to the generation 504 discussed above with respect to FIG. 5. Upon determining 302 the feedback constant, one or more test surround mix coefficients may be generated 304 by the controller 940, as will be described with respect to FIG. 13.

FIG. 13 is a flow chart illustrating operation of the controller 940 when generating test surround mix coefficients for the downmixer 900, for example the test surround channel mix coefficients mi' and ms'. As shown in FIG. 13, it is determined 1300 whether a value of the feedback constant fbsi, determined at 1202, is greater than or equal to zero. Where the feedback constant is not greater than or equal to zero, a value of the test surround mix coefficient ms' is set by the controller 940 at 1302, to a value of $$ms'=0-fbsi, \quad \text{(eqn. 42)}$$

and a value of the test mix coefficient mi' is set at 1304 to a value of 1. However, where it is determined 1300 that the feedback constant is greater than or equal to zero, a value of ms' is set at 1306 to zero and at 1308, a value of mi' is set to $$mi'=1-fbsi. \quad \text{(eqn. 43)}$$

Where mi' is less than zero, mi' is reset at 1310 to a value of zero.

After generating the test mix coefficients mi' and ms', the test surround mix coefficients mi' and ms' may be utilized by the controller to update the surround mix coefficients mi and ms used by the full-bandwidth downmixer 901. The updating 1312 may be accomplished in a similar fashion as described above, for example with respect to the updating 608 of FIG. 6.

The mix coefficient mi may be utilized in the downmixer 900 to attenuate one or both of the surround channels, for example, when the LSI or RSI channels are driven together by the same signal. The surround mix coefficient mi may be adjusted by a small feedback loop to keep the input power and the output power substantially equal. The surround mix coefficient ms may be utilized, for example, to bypass the 90 degree phase shifters 924 and 934, where ms may control an amount of cross-mixed surround signal that is added to the front channels, for example, in situations where LSI and RSI are out of phase. Where ms has a positive, non-zero value, a coherent signal of the surround input channels may be provided in both the 90 degrees phase-shifted path and the non-90 degree phase shifted path of the downmixer 900.

In at least some circumstances, it may be desirable to make modifications/adjustments to one or more of the surround mix coefficients, for example the surround mix coefficients mi and ms determined with respect to FIG. 13, before or during the time they are used by the downmixer 900. As with the generating of the front channel mix coefficients ml and mr, the surround channel mix coefficient(s) mi and ms are typically generated in a test downmixer environment. By utilizing the test downmixer for generating one or both of the mix coefficients mi and ms, the coefficients may be additionally modified/adjusted before being used in a full frequency range downmixer, where values for mi and ms may be kept in the test downmixer to not disturb the feedback.

Values of one or both of the surround mix coefficients mi and ms may be adjusted to create a two-channel downmix that is subjectively closer to the original five-channel downmix by altering an energy ratio between the front channels and the rear channels in an active manner. Such modifications may adjust for a situation where there is too much reverberation in the surround channels. A ratio of the energy in the front channels and the surround channels, F/S, may be utilized to adjust the mix coefficients mi and ms. The adjustments may include reducing at least one or both of mi and ms by some amount, for example, corresponding to 3 dB of the LSI and/or RSI channel information, where a F/S ratio is greater than 1, as discussed below. Further, in some situations, it may be desirable to actively look for audible sound elements (i.e., non-reverberation sound information) in one or more of the input channels, for example, in one or both of the surround channels LSI and RSI. When audible sound elements are present, the 3 dB attenuation applied to the mix coefficients mi and ms may be removed.

In addition, the surround mix coefficients mi and ms may be adjusted to enhance various sound events, for example, to emphasize surround channel signals that may not be as strong as simultaneous signals occurring in the front channels received at the downmixer 900. A sound event may be thought of as a directional transient, for example, sounds that have an initial energy spike, such as a shout or a drum hit, and where information about the transient direction is maintained (i.e., not blocked by an object). Two types of sound events may be syllables and impulsive sounds. Syllables may include phonemes and notes. Phonemes are transient sounds that are characteristic of phones in human speech and that can be particularly useful in detecting and localizing syllables in human speech. Notes are individual notes created by a musical instrument. Because notes and phonemes have a common characteristic, they may be collectively referred to as "syllables". Syllables, generally have the following characteristics: a finite duration of approximately at least 50 ms up to approximately 200 ms, but typically around 150 ms; rise times of approximately 33 ms; generally occur no more frequently than approximately once every 0.2 ms to approximately 0.5 ms; and may have low or high volume (amplitude). In contrast, impulsive sounds may be transients of very short duration such as a drum hit or frictives, and explosives in speech. Impulsive sounds generally have the following characteristics: a short duration of approximately 5 ms to approximately 50 ms, rise times of approximately 1 ms to approximately 10 ms, and a high volume.

A sound event may be detected, for example, as described in commonly-assigned U.S. patent application Ser. No. 10/428,451, entitled "Sound Event Detection", to David H. Griesinger, filed May 2, 2003, and is incorporated by reference herein. For example, a rate of increase in an input energy level at one of the input channels may be utilized to detect the start of a sound event. For example, a rate of increase in one or both of the LSI and RSI channels may be detected, where a value of the mix coefficients mi and/or ms may be adjusted to allow the sound event to be more prominent in the two channel mix than if signal power were completely preserved. For example, any 3 dB attenuation applied to combat a detected reverberation signals in one or more of the input channels may be removed. The sound event detector may be utilized in conjunction with any of the input channels, and the presence of a significant sound event in a particular input channel may be used to trigger a temporary boost of the level in that channel. The boost may be accomplished by increasing a value for one or more mix coefficients, for example, the mix coefficients mi and ms. Such a boost may last, for example, 100 to 300 ms. Further, the boost may be, for example, a boost corresponding to a gain of 1-3 dB of the corresponding channel information for enhancing the audibility of low level sound events in the resulting downmix.

FIGS. 14-17 are flowcharts illustrating adjustment of surround mix coefficient(s).

Figure 14:
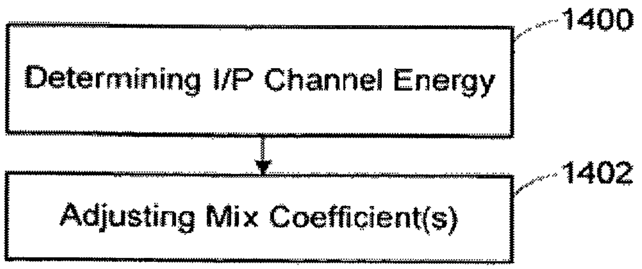
FIG. 14 is a flowchart illustrating the adjusting of mix coefficients generated for the downmixer of FIG. 9.

FIG. 14 is a flowchart illustrating operation of the controller 940 in adjusting one or more mix coefficients, for example, the surround mix coefficients mi and ms. As shown in FIG. 14, input channel energy is determined 1400. The determining 1400 of the input channel energy is discussed below with respect to the flowchart of FIG. 15. Upon determining 1400 the input channel energy, one or more mix coefficients, for example mi and ms, may be adjusted 1402. Mix coefficient adjusting 1402 is discussed below with respect to the flowcharts of FIGS. 16-17.

Figure 15:
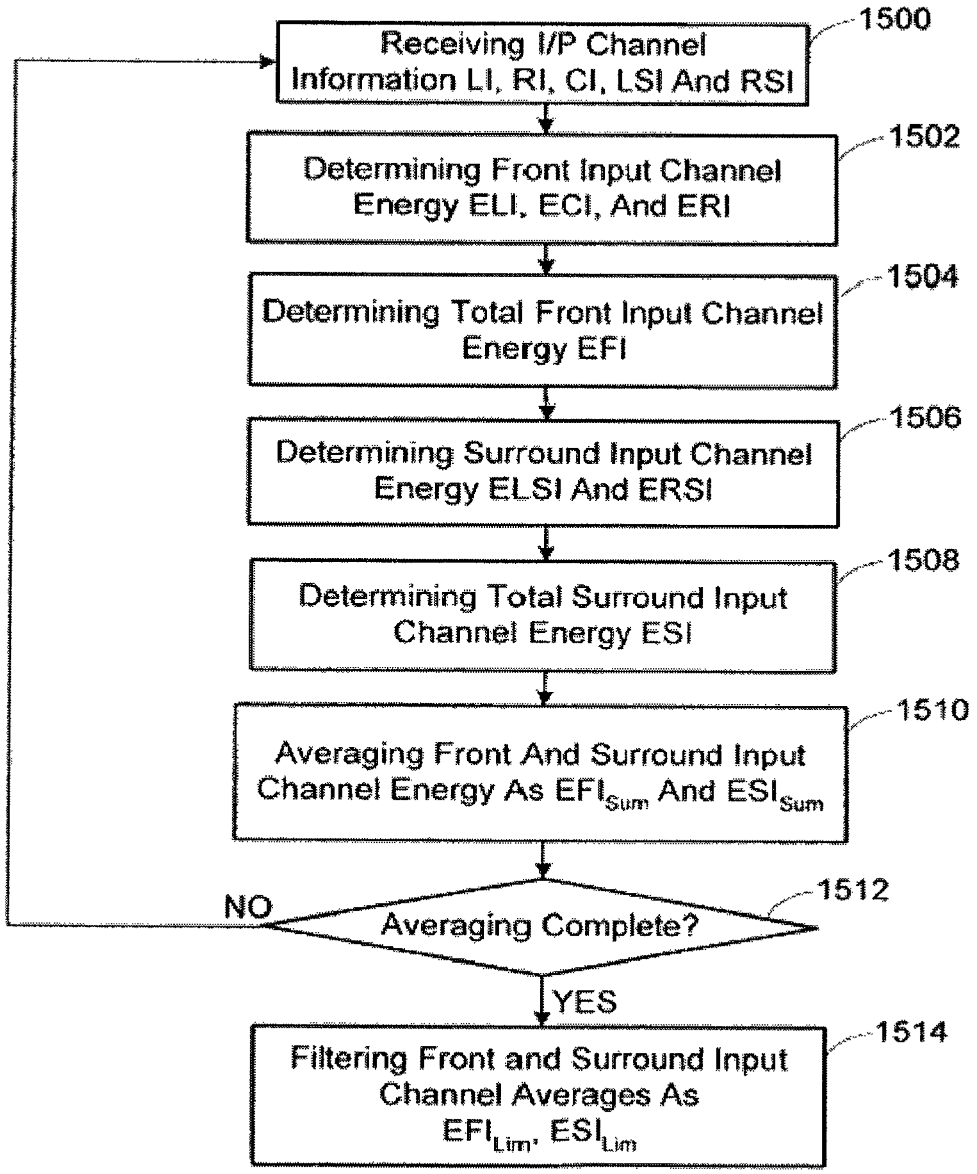
FIG. 15 is a flowchart illustrating the determining channel energy of FIG. 14.

FIG. 15 is a flowchart illustrating operation of the controller 940 in determining 1400 the input channel energy. Input channel information is received 1500, and may include information regarding the LI, RI, CI, LSI, and RSI channels of the input signal. A front input channel energy may be determined 1502 for the LI, CI, and RI channels as ELI, ECI, and ERI, where $$ELI=LI^2 \quad \text{(eqn. 44)}$$

$$ECI=CI^2, \text{ and} \quad \text{(eqn. 45)}$$

$$ERI=RI^2. \quad \text{(eqn. 46)}$$

The IP channel information may be received 1500 in a similar fashion as discussed above with respect to the receiving 400 of FIG. 4. A total front input channel energy may be determined 1504 as EFI, where $$EFI=ELI+ECI+ERI. \quad \text{(eqn. 47)}$$

A surround input channel energy may be determined 1506 for a LSI channel and a RSI channel as ELSI and ERSI respectively, where $$ELSI=LSI^2, \text{ and} \quad \text{(eqn. 48)}$$

$$ERSI=RSI^2. \quad \text{(eqn. 49)}$$

A total surround input channel energy, ESI, may be determined 1508, as $$ESI=ELSI+ERSI. \quad \text{(eqn. 50)}$$

The front and surround input channel energy may be averaged 1510 as $EFI_{Sum}$ and $ESI_{Sum}$, respectively, where $$EFI_{Sum}=0.9*EFI_{Sum}+0.1*EFI, \text{ and} \quad \text{(eqn. 51)}$$

$$ESI_{Sum}=0.9*ESI_{Sum}+0.1*ESI. \quad \text{(eqn. 52)}$$

The averaging 1510 may be accomplished in a similar fashion as discussed above, for example, with respect to the averaging 410 of FIG. 4.

It may be determined 1512 whether the averaging is complete. Where the averaging is not complete, the flow returns to the receiving 1500 input channel information and continues as discussed above. Where it is determined 1512 that the averaging is complete, the front and surround input channel averages are filtered 1514 as $EFI_{Lim}$ and $ESI_{Lim}$, where $$EFI_{Lim}=0.99*EFI_{Lim}+0.01*(EFI_{Sum}), \text{ and} \quad \text{(eqn. 53)}$$

$$ESI_{Lim}=0.97*ESI_{Lim}+0.03*(ESI_{Sum}). \quad \text{(eqn. 54)}$$

Figure 16:
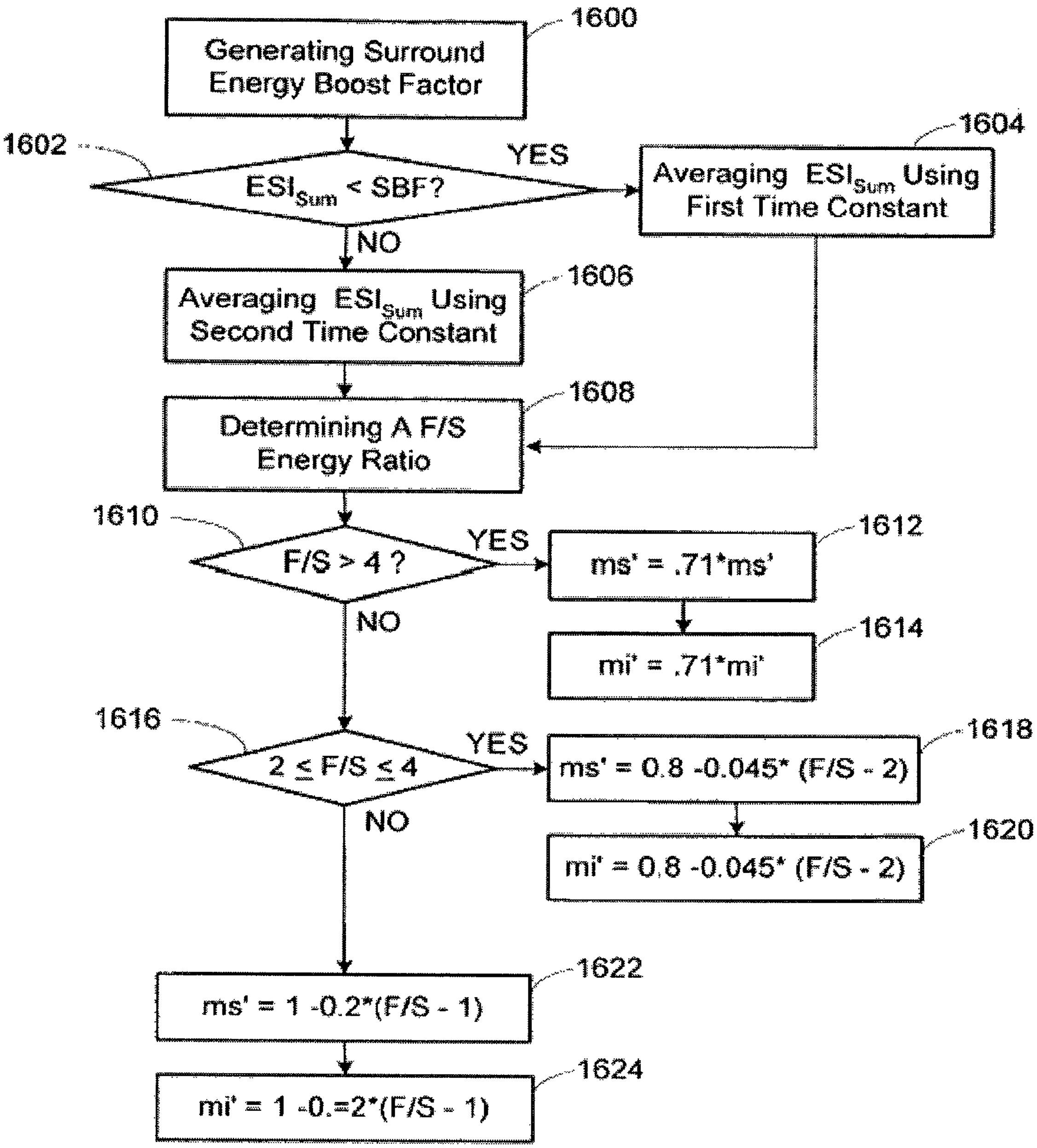
FIGS. 16-17 are flowcharts illustrating the adjusting of one or more mix coefficients of FIG. 14.
Figure 17:
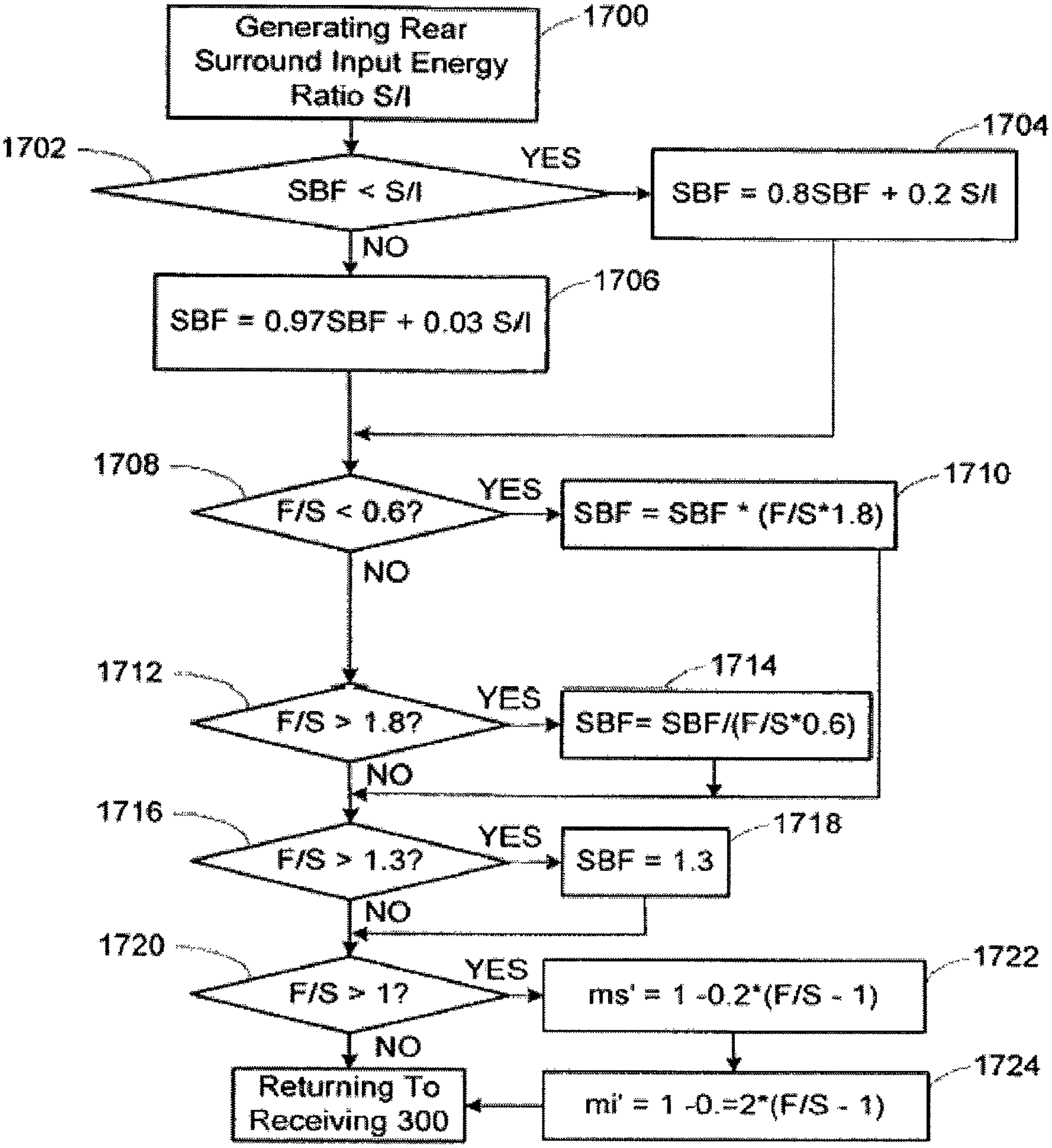

Once the input channel energy is determined 1400, the mix coefficients may be adjusted 1402 as described with respect to the flowcharts of FIGS. 16 and 17.

FIG. 16 is a flowchart illustrating operation of the controller 940 in adjusting 1402, one or more mix coefficients, for example the surround mix coefficients mi and ms. As shown in FIG. 16, a surround energy boost factor, SBF, may be generated 1600 as $$SBF=3*ESI-2*ESI_{Lim}. \quad \text{(eqn. 55)}$$

It may then be determined whether the average surround energy, $ESI_{Lim}$, is rising. This is accomplished by determining 1602 whether the average surround energy is less than the surround energy boost factor. Where it is determined that the average surround energy is less than the surround energy boost factor, the average surround energy may be averaged 1604 using a first time constant, for example as $$ESI_{Sum}=0.99*ESI_{Sum}+0.01*SBF. \quad \text{(eqn. 56)}$$

The first time constant may be, for example, approximately 150 ms.

However, where it is determined 1602 that the average surround energy is not less than the energy boost factor, the average surround energy may be averaged 1606 using a second time constant, as $$ESI_{Sum}=0.999*ESI_{Sum}+0.001SBF, \quad \text{(eqn. 57)}$$

where the second time constant may be, for example, approximately, 1.5 seconds.

The average surround input energy may then be averaged responsive to a current value of the surround input energy. This may be accomplished, for example, by steps 1602, 1604, and 1606.

A front/back energy ratio, F/S, may be determined 1608 as an energy ratio between the average front channel and average surround channel input energies, as $$F/S=(EFI_{Sum}+1)/((1.2*ESI_{Sum})+1). \quad \text{(eqn. 58)}$$

The front/surround energy ratio may be a bias to the surround input channel, by for example, 1.2 dB. Further, the front/surround energy ratio may be constrained within a range of 0.1 and 10. For example, where the front/surround power ratio is greater than 10, the front/surround energy ratio may be set to a value of 10. Where the front/surround energy ratio is less than 0.1, the front/surround energy ratio may be set to a value of 0.1.

The mix coefficients mi and ms may determined responsive to the front/surround energy ratio. This may be accomplished by determining 1610 whether the front/surround energy ratio is greater than a value of 4. Where the front/surround energy ratio is greater than 4, the mix coefficients ms and mi may be set at 1612 and 1614 to $$ms=0.71*ms, \text{ and} \quad \text{(eqn. 59)}$$

$$mi=0.71*mi. \quad \text{(eqn. 60)}$$

However, where it is determined 1610 that the front/surround energy ratio is not greater than 4, it may be determined 1616 whether the front/surround energy ratio is greater than or equal to a value of 2, and less than or equal to a value of 4. If the front/surround energy ratio is greater than or equal to 2 and less than or equal to 4, the mix coefficients ms and mi may be set 1618 and 1620, respectively, as $$ms=0.8-0.045*(F/S-2), \text{ and} \quad \text{(eqn. 61)}$$

$$mi=0.8-0.045*(F/S-2). \quad \text{(eqn. 62)}$$

If however, it is determined 1616 that the front/surround energy ratio is not greater than or equal to 2 and less than or equal to 4, the mix coefficients ms and mi may set 1622 and 1624, as $$ms=1-0.2*(F/S-1), \text{ and} \quad \text{(eqn. 63)}$$

$$mi=1-0.2*(F/S-1). \quad \text{(eqn. 64)}$$

Further, the values for the mix coefficients, for example the surround mix coefficients mi and ins may be adjusted responsive to an increase in surround channel input levels as a surround channel level increase ratio, S/I. Adjustments to the mix coefficients mi and ms responsive to the rear surround channel input level is discussed with respect to the flowchart of FIG. 17.

FIG. 17 is a flowchart illustrating operation of the controller 940 in adjusting one or more mix coefficients, for example the surround mix coefficients mi and ms, in response to a rear surround input energy level ratio S/I. As shown in FIG. 17, a rear surround input energy ratio, S/I, is generated 1700, where $$S/I=SBF/ESI_{Lim}, \quad \text{(eqn. 65)}$$

where the surround energy boost factor is as determined with respect to FIG. 16, and the $ESI_{Lim}$ is as determined with respect to FIG. 15. It is then determined 1702 whether a second surround boost factor indicators, SBF2 is less than the surround input energy ratio. Where the second boost factor is less than the energy ratio, the second surround boost factor is set 1704 as $$SBF2=0.8SBF2+0.2S/I, \quad \text{(eqn. 66)}$$

However, where the second surround boost factor is not less than the surround input energy ratio, the second surround boost factor indicator may be set 1706 as $$SBF2=0.97SBF2+0.03S/I \quad \text{(eqn. 67)}$$

where the second surround boost factor 1704 represents a time constant of approximately 7 ms, and the second boost factor at 1706 represents a time constant of approximately 70 ms.

The second surround boost factor indicator may be scaled responsive to F/S. This is accomplished, by determining 1708 whether F/S is less than 0.6. Where F/S is less than 0.6, the surround boost factor indicator SBF may be scaled as $$SBF2=SBF2*(S/I*1.8). \quad \text{(eqn. 68)}$$

However, where it is determined 1708 that F/S is not less than 0.6, it may be determined 1712 whether F/S is greater than 1.8. Where F/S is greater than 1.8, the second surround boost factor may be scaled 1714 as $$SBF2=SBF2/(S/I*0.6). \quad \text{(eqn. 69)}$$

Where the second surround boost factor has been scaled 1710 or 1714, or where it is determined 1712 that F/S is not greater than 1.8, it may be determined 1716 whether the F/S is greater than 1.3. Where it is determined 1716 that the F/S is greater than 1.3, the second surround boost factor may be scaled 1718 to a value of 1.3. Where the second surround boost factor is scaled 1718, or where the F/S is determined not to be greater than 1.3, it may be determined 1720 whether the F/S is greater than 1.

Where it is determined 1720 that the F/S is greater than 1, the second surround mix coefficients ms and mi may be set 1722 and 1724 as $$ms=ms*SBF2, \text{ and} \quad \text{(eqn. 70)}$$

$$mi=mi*SBF2. \quad \text{(eqn. 71)}$$

Where the surround mix coefficients ms and mi have been set 1722 and 1724 or where it is determined 1720 that the F/S is not greater than 1, flow may return to the receiving input channel information 1100 and continue as discussed with respect to FIG. 11.

Although the adjustment/modification to mix coefficients has been discussed as occurring after generating mix coefficients that may be utilized in a downmixer for substantially preserving energy and intended direction of an input signal at the output signal, it will be apparent that the mix coefficient adjustments discussed with respect to FIGS. 14-16 may be made independent of mix coefficient generation discussed with respect to FIGS. 4-6 and/or FIGS. 11-13. Further, the mix coefficient adjustments made with respect to FIGS. 14-17 may be made at particular intervals, for example, at every 64 samples of audio signal information processed at the downmixer, where, for example, an overall sampling rate of the input signal is 44,100 samples per second. Other particular periods may be utilized for adjusting/modifying mix coefficients. Further, the downmixer may be capable of processing audio signals at sampling rates other than 44,100 samples per second.

Although the downmixers 100 and 900 have been described as downmixers or downmixing input signals having 3 input channels and 5.1 input channels to output signals having 2 output channels respectively, it will be apparent that the teachings described above may be applied to a downmixer for mixing an input signal having any number of input channels to an output signal having a number of output channels less than the number of input channels. The downmixers 100 and 900 may be implemented on one or more microprocessors executing suitable programmed code stored in internal memory of the microprocessor and/or the storage device 120 and 942 respectively. For example, the microprocessor(s)

may be sufficiently programmed for, and possess processing capabilities and other hardware requirements, for allowing the microprocessors to provide the functionalities described herein with respect to the downmixers 100 and 900. Further, the microprocessors may be capable of providing any digital signal processing, filtering or other functionalities in caring out the downmixing described herein.

The test mixers may be utilized in generating mix coefficient values at all times while the downmixer 100 or 900 is operating. The controller, using a test mixer, for example, test mixer 104 or test mixer 950, may constantly monitor input and output energy, and determine one or more mix coefficient values when appropriate to allow signal energy and intended direction of the input signal to be substantially preserved at the output signal. Alternatively, the controller 106 may monitor the input and output signal energies at the full-bandwidth downmixer, and invoke the test downmixer to generate mix coefficient values in circumstances when the full bandwidth output energy is not equal to the full bandwidth input energy.

Although front channel and surround channel mix coefficient values have been described as being generated using test mixers, for example, test mixer 104 and test mixer 950, respectively, it will be apparent that mix coefficient values may be determined using the full-bandwidth downmixer, while the downmixer is downmixing the input signal to the output signal. In this circumstance, a test mixer may not be needed or provided. For example, the controller 106 may determine the input energies of the full-bandwidth input, and full-bandwidth output signals of the full-bandwidth downmixer, and generate and/or update mix coefficient values utilizing this full-bandwidth energy in a similar fashion as described above with respect to FIGS. 4-6 and 11-13 for limited-bandwidth energies. In addition, although the test downmixer 950 is described as being utilized with a 5.1 to channel downmixer, it will be apparent that the test downmixer 950 may be utilized for generating surround mix coefficient values that may be utilized in any downmixer having surround channel downmixing capabilities.

A downmixer is provided capable of generating mix coefficients such that energy and intended direction of the input signal is substantially preserved at the output signal. Such mix coefficient generation may be accomplished, for example, in a test downmixer, where values for mix coefficients may be updated to a non-test downmixer, for example a full-bandwidth downmixer. The test downmixer may operate on limited-bandwidth input channel information, such that mix coefficient values may be generated that accentuate the substantially audible frequencies that are perceivable by human listeners Further, the downmixer may be capable of adjusting mix coefficient values, responsive to a ratio of energy at some combination of a plurality of the input channels (i.e., a ratio of front channel energy to rear channel energy, etc. . . . ). The mix coefficients may be adjusted, for example, to emphasize detected beginnings of sound events, such as notes from an instrument, or syllables in speech, when downmixing the input signal. In addition, or in the alternative, the mix coefficient values may be adjusted to provide a more accurate rendition of reverberation of the input signal at the output signal. In addition, the downmixer may be capable of preserving intended direction of a input signal when the downmixed signal is later upmixed, for example, at a decoder. The decoder may be capable of determining that surround channel information that has been downmixed in accordance to at least some of the teachings described herein is surround channel information that may be upmixed as surround channel information.

The downmixers 100 and 900 are typically implemented as programming executed on one or more microprocessors for carrying out the functionalities described herein. However, it will be apparent that the downmixers may be implemented using any combination of hardware devices and/or programming executed on one or more microprocessors to carry out the functionalities described herein.

Similarly, the controllers 106 and 940 may be comprised of any combination of hardware devices designed for specific functionalities (including, for example, applications specific integrated circuits capable of providing functionalities such as filtering, mixing, and alike). The controllers 106 and 940 may be comprised of a microprocessor(s) executing programmed code to achieve the functionalities described with respect to the controllers 106 and 940.

The storage device 120 and the storage device 942 may comprise one or more fixed or removable storage devices including, but not limited to, solid state media, magnetic and optical media. The solid state media may include, but is not limited to, integrated circuits such as ROMs, PROMs, EPROMs, EEPROMs, and any type of RAM, as well as removable memory storage devices such as a flash media card, and any derivative memory systems of these devices. The magnetic media may include, but is not limited to, magnetic tape, magnetic disks such as floppy diskettes and hard disk drives. The optical media may include, but is not limited to, optical disks such as a Compact Disc and a Digital Video Disc. Typically, the storage devices 120 and 942 include working memory (RAM) portion, and a program memory portion for storing programmed code for any microprocessors implementing the functionalities described herein. Further, the storage devices 120 and 942 may further include a sufficient storage medium for storing, for example, mix coefficient tables for downmixing the input signal to the output signal, described above.

Although the downmixers 100 and 900, and specifically the controllers 106 and 940, have been described as averaging input and output signal energies over a particular time period, for example, the first time period, it will be apparent that the averaging may be accomplished over other time periods. Further, it will be apparent that at least some of the advantages discussed above may be achieved where the input and/or output signal energy is not averaged.

Further, although it has been described that the one or more mix coefficients are generated in a test mixer, it will be apparent that a test mixer need not be provided, where the mix coefficients may be generated and/or adjusted during operation of the full-bandwidth downmixers 102 and 901 while the respective full-bandwidth downmixer is downmixing the input signal to the output signal, while achieving at least some of the advantages discussed above.

A method and system have been described for generating one or more mix coefficients for downmixing a multichannel input signal having a plurality of input channels, to an output signal having a plurality of output channels. Mix coefficients may be generated responsive to a comparison of energy between the downmixed (output) signal and the input signal to the downmixer, such that energy and intended direction of the input signal are substantially preserved in the output signal. Further, or in the alternative, the mix coefficient generation may preserve an intended direction of an input signal, for example, received at a surround input channel, in at least one output channel of the output signal. The mix coefficient values may be generated in a test downmixer environment. Additionally, one or more mix coefficients may be generated by retrieving predetermined mix coefficient values. Additionally, or in the alternative, one or more mix coefficients may be generated responsive to an input energy of a plurality of the input channels.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method of determining mix coefficients for downmixing a multichannel input signal, having a right input channel, a left input channel and a center input channel to an output signal having a right output channel and a left output channel, comprising:

receiving a multichannel input signal at signal inputs corresponding to each input channel;

bandwidth limit filtering each input channel of the multichannel input signal with a controller coupled to the signal inputs to obtain bandwidth limited input channel information for each input channel;

determining a bandwidth limited input channel energy for each of the right input channel and the left input channel using the bandwidth limited input channel information for each of the right, left and center input channels;

determining a bandwidth limited output channel energy for the right output channel and the left output channel using the bandwidth limited input channel information for each of the right, left and center input channels and at least one of a plurality of test mix coefficients having a current value;

determining an updated value for the at least one of the plurality of test mix coefficients based on a comparison between the bandwidth limited input channel energy of one of either the left input channel or the right input channel with the bandwidth limited output channel energy of the corresponding one of either the left output channel or right output channel;

updating a corresponding at least one of a plurality of full bandwidth mix coefficients using the updated value of the at least one of the plurality of test mix coefficients; and mixing, with the controller, the multichannel input signal to obtain the output signal using the full bandwidth mix coefficients.

2. The method of claim 1, where the step of determining the updated value of the at least one of the plurality of test mix coefficients comprises:

determining whether the bandwidth limited output channel energy of one of either the left output channel or the right output channel exceeds the bandwidth limited input channel energy of the corresponding one of either the left input channel or the right input channel, and responsively selecting between multiple different feedback constant generation equations to determine a feedback constant; and where updating comprises:

updating the test mix coefficients using the feedback constant.

3. The method of claim 1, further comprising: preserving intended direction of the multichannel input signal when updating the test mix coefficients.

4. The method of claim 1, where bandwidth limit filtering comprises:

bandwidth limit filtering the multichannel input signal to obtain bandwidth limited input signal channel information in a limited frequency range most sensitive to a selected listener.

5. The method of claim 1, where bandwidth limit filtering comprises:

bandwidth limit filtering the multichannel input signal down to approximately 700 Hz.

6. The method of claim 1, where bandwidth limit filtering comprises:

bandwidth limit filtering the multichannel input signal up to approximately 4000 Hz.

7. The method of claim 1 where the multichannel input signal further includes a left surround channel and a right surround channel, the method comprising:

after the step of bandwidth limit filtering each input channel to obtain bandwidth limited left surround input channel information and bandwidth limited right surround input channel information, determining a bandwidth limited left surround input channel energy and a bandwidth limited right surround input channel energy using the bandwidth limited left surround input channel information and bandwidth limited right surround input channel information;

determining bandwidth limited left surround output channel energy and bandwidth limited right surround output channel energy using the bandwidth limited left surround input channel information, the bandwidth limited right surround input channel information and test surround mix coefficients having a current value;

determining bandwidth limited input surround energy based on the bandwidth limited left surround input channel energy and the bandwidth limited right surround input channel energy;

determining bandwidth limited output surround energy based on the bandwidth limited left surround output energy and the bandwidth limited right surround output energy;

determining an updated value for the test surround mix coefficients based on a comparison between the bandwidth limited surround input energy and bandwidth limited surround output energy;

updating a plurality of full bandwidth surround mix coefficients using the updated test surround mix coefficients; and mixing the left and right surround input channels with the left and right input channels using the full bandwidth surround mix coefficients.

8. A system for determining mix coefficients for downmixing a multichannel input signal having a right input channel, a left input channel and a center input channel to an output signal having a right output channel and a left output channel, comprising:

a signal input having inputs corresponding to each input channel of the-multi-channel input signal;

a controller coupled to the left input channel, the center input channel, and the right input channel of the signal input and comprising instructions that when executed cause the controller to:

bandwidth limit filter each input channel of the multichannel input signal to obtain bandwidth limited input signal channel information for each input channel;

determine bandwidth limited input channel energy for each of the right input channel and the left input channel using the bandwidth limited input channel information for each of the right, left and center input channels;

determine bandwidth limited output channel energy for the right output channel and the left output channel using the bandwidth limited input channel information for each of the right, left and center input channels and at least one of a plurality of test mix coefficients having current value;

determine an updated value for the at least one of the plurality of test mix coefficients based on a comparison between the bandwidth limited input channel energy of one of either the left input channel or the right input channel with the bandwidth limited output channel energy of the corresponding one of either the left output channel or right output channel;

update a corresponding at least one of a plurality of full bandwidth mix coefficients using the updated value of the at least one of the plurality of test mix coefficients; and mix the multichannel input signal to obtain the output signal using the full bandwidth mix coefficients.

9. The system of claim 8, where when the controller determines the updated value of the at least one of the plurality of test mix coefficients, the instructions cause the controller to:

determine whether the bandwidth limited output channel energy of one of either the left output channel or the right output channel exceeds the bandwidth limited input channel energy of the corresponding one of either the left input channel or the right input channel, and responsively select between multiple different feedback constant generation equations to determine a feedback constant; and update the test mix coefficients using the feedback constant.

10. The system of claim 8, where the instructions cause the controller to:

preserve intended direction of the multichannel input signal when updating the test mix coefficients.

11. The system of claim 8, where the instructions cause the controller to:

bandwidth limit filter the multichannel input signal to obtain bandwidth limited input signal channel information in a limited frequency range most sensitive to a selected listener.

12. The system of claim 8, where the instructions cause the controller to:

bandwidth limit filter the multichannel input signal down to approximately 700 Hz.

13. The system of claim 8, where the instructions cause the controller to:

bandwidth limit filter the multichannel input signal up to approximately 4000 Hz.

14. The system of claim 8 where the multichannel input signal further includes a left surround channel and a right surround channel, where the controller further comprises instructions that when executed cause the controller to:

after bandwidth limit filtering each input channel to obtain bandwidth limited left surround input channel information and bandwidth limited right surround input channel information, determine a bandwidth limited left surround input channel energy and a bandwidth limited right surround input channel energy using the bandwidth limited left surround input channel information and bandwidth limited right surround input channel information;

determine bandwidth limited left surround output channel energy and bandwidth limited right surround output channel energy using the bandwidth limited left surround input channel information, the bandwidth limited right surround input channel information and test surround mix coefficients having a current value;

determine bandwidth limited input surround energy based on the bandwidth limited left surround input channel energy and the bandwidth limited right surround input channel energy;

determine bandwidth limited output surround energy based on the bandwidth limited left surround output energy and the bandwidth limited right surround output energy;

determine an updated value for the test surround mix coefficients based on a comparison between the bandwidth limited surround input energy and bandwidth limited surround output energy;

update a plurality of full bandwidth surround mix coefficients using the updated test surround mix coefficients; and mix the left and right surround input channels with the left and right input channels using the full bandwidth surround mix coefficients.

15. A non-transitory machine readable storage medium comprising:

a machine readable medium; and instructions stored on the medium that determine mix coefficients for downmixing a multichannel input signal having a right input channel, a left input channel and a center input channel to an output signal having a right output channel and a left output channel by causing a controller to:

receive the multichannel input signal at a signal input;

bandwidth limit filter each input channel of the multichannel input signal to obtain bandwidth limited input signal channel information for each input channel;

determine bandwidth limited input channel, energy for each of the right input channel and the left input channel using the bandwidth limited input channel information for each of the right, left and center input channels;

determine bandwidth limited output channel energy for the right output channel and the left output channel using the bandwidth limited input channel information for each of the right, left and center input channels and least one of a plurality of test mix coefficients having a current value;

determine an updated value for the at least one of the plurality of test mix coefficients based on a comparison between the bandwidth limited input channel energy of one of either the left input channel or the right input channel with the bandwidth limited output channel energy of the corresponding one of either the left output channel or right output channel;

update a corresponding at least one of a plurality of full bandwidth mix coefficients using the updated value of the at least one of the plurality of test mix coefficients; and mix the multichannel input signal to obtain the output signal using the full bandwidth mix coefficients.

16. The non-transitory machine readable storage medium of claim 15, where when the controller determines the updated value of the at least one of the plurality of test mix coefficients, the instructions that update the test mix coefficients cause the controller to:

determine whether the bandwidth limited output channel energy of one of either the left output channel or the right output channel exceeds the bandwidth limited input channel energy of the corresponding one of either the left input channel or the right input channel, and responsively select between multiple different feedback constant generation equations to determine a feedback constant; and where the instructions that update:

update the test mix coefficients using the feedback constant.

17. The non-transitory machine readable storage medium of claim 15, where the instructions that cause the controller to bandwidth limit filter:

cause the controller to bandwidth limit filter the multichannel input signal to obtain bandwidth limited input signal channel information in a limited frequency range most sensitive to a selected listener.

18. The non-transitory machine readable storage medium of claim 15, where the instructions that cause the controller to bandwidth limit filter:

cause the controller to bandwidth limit filter the multichannel input signal down to approximately 700 Hz.

19. The non-transitory machine readable storage medium of claim 16, where the instructions that cause the controller to bandwidth limit filter:

cause the controller to bandwidth limit filter the multichannel input signal up to approximately 4000 Hz.

20. The non-transitory machine readable storage medium of claim 15 where the controller further comprises instructions that when executed cause the controller to:

after bandwidth limit filtering each input channel to obtain bandwidth limited left surround input channel information and bandwidth limited right surround input channel information, determine a bandwidth limited left surround input channel energy and a bandwidth limited right surround input channel energy using the bandwidth limited left surround input channel information and bandwidth limited right surround input channel information;

determine bandwidth limited left surround output channel energy and bandwidth limited right surround output channel energy using the bandwidth limited left surround input channel information, the bandwidth limited right surround input channel information and test surround mix coefficients having a current value;

determine bandwidth limited input surround energy based on the bandwidth limited left surround input channel energy and the bandwidth limited right surround input channel energy;

determine bandwidth limited output surround energy based on the bandwidth limited left surround output energy and the bandwidth limited right surround output energy;

determine an updated value for the test surround mix coefficients based on a comparison between the bandwidth limited surround input energy and bandwidth limited surround output energy;

update a plurality of full bandwidth surround mix coefficients using the updated test surround mix coefficients; and mix the left and right surround input channels with the left and right input channels using the full bandwidth surround mix coefficients.

* * * * *